(12) United States Patent
Guibene

(10) Patent No.: US 11,476,919 B2
(45) Date of Patent: Oct. 18, 2022

(54) METHOD FOR PROVIDING CONTINUOUS CONNECTIVITY TO A DEVICE

(71) Applicant: Charter Communications Operating, LLC, St. Louis, MO (US)

(72) Inventor: Wael Guibene, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/779,098

(22) Filed: Jan. 31, 2020

(65) Prior Publication Data
US 2021/0242932 A1 Aug. 5, 2021

(51) Int. Cl.
H04B 7/185 (2006.01)
H04W 28/02 (2009.01)
H04W 88/16 (2009.01)

(52) U.S. Cl.
CPC ..... H04B 7/18513 (2013.01); H04B 7/18517 (2013.01); H04W 28/0268 (2013.01); H04W 88/16 (2013.01)

(58) Field of Classification Search
None
See application file for complete search history.

(56) References Cited

U.S. PATENT DOCUMENTS

| 8,675,572 | B1* | 3/2014 | Leung | H04W 72/1289 |
| | | | | 370/329 |
| 2002/0193108 | A1* | 12/2002 | Robinett | H04B 7/18554 |
| | | | | 455/430 |
| 2007/0010246 | A1* | 1/2007 | Churan | H04B 1/7097 |
| | | | | 455/12.1 |
| 2015/0124616 | A1* | 5/2015 | Lohman | H04W 28/0284 |
| | | | | 370/235 |
| 2019/0260464 | A1* | 8/2019 | Roy | H04B 7/18519 |

\* cited by examiner

*Primary Examiner* — Adnan Baig
(74) *Attorney, Agent, or Firm* — Straub & Straub; Michael P. Straub; Stephen T. Straub

(57) ABSTRACT

A communications system, e.g. an Internet-of-Things (IoT) communications system, includes satellite gateways in addition to terrestrial gateways. High QoS end point devices utilize communications via satellite gateway to be able to communicate with a network server when communications with the network server via terrestrial gateways are unavailable or unreliable. Low QoS end point devices may communicate with the network server via terrestrial gateways but are restricted from using the satellite gateways. An additional receive window, corresponding to the satellite gateway, is used for communicating downlink signals from the satellite gateway to the high QoS end point device.

20 Claims, 21 Drawing Sheets

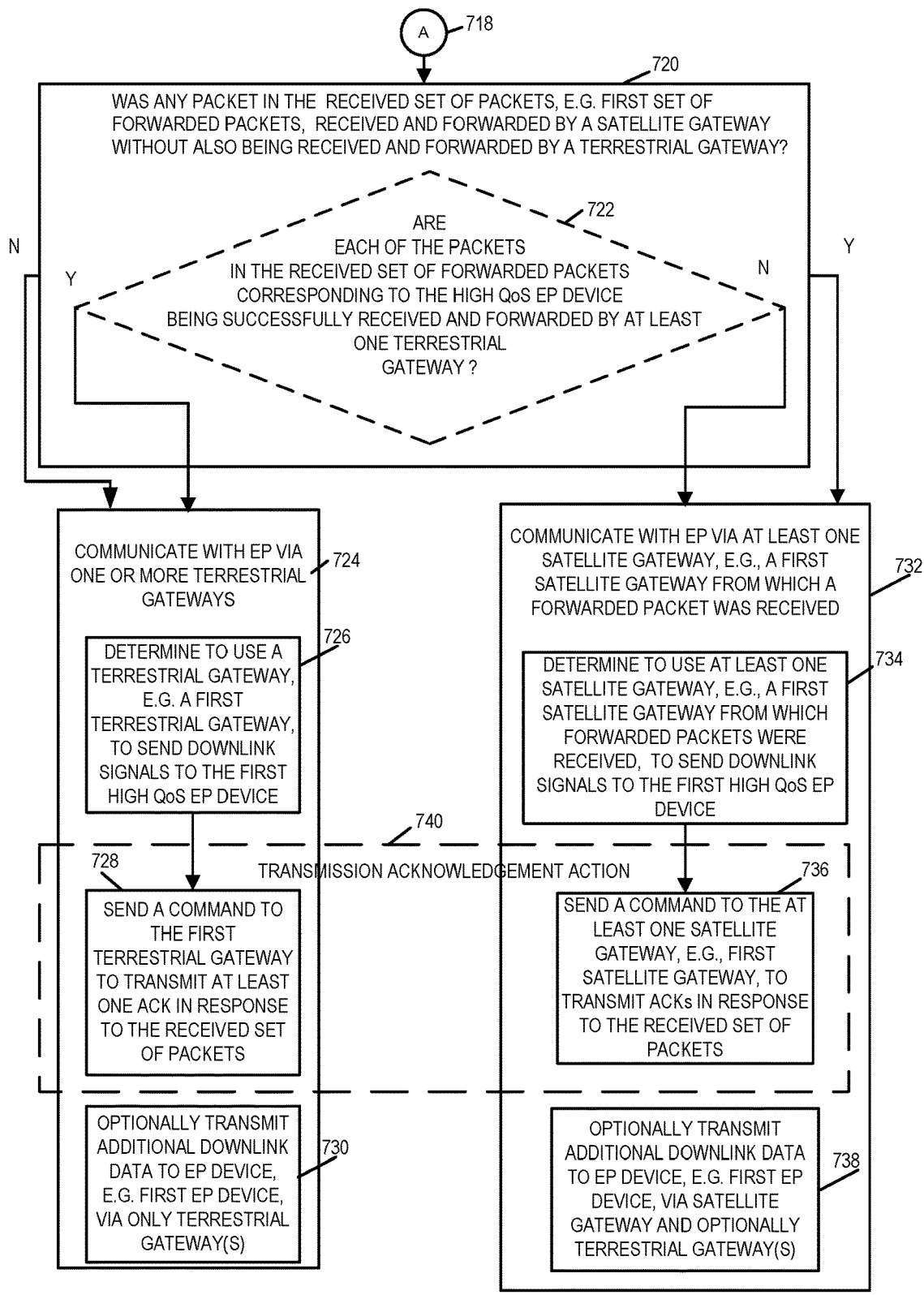

| FIGURE 16A | FIGURE 16B |

METHOD FOR PROVIDING CONTINUOUS CONNECTIVITY TO A DEVICE

FIELD

The present invention relates to wireless communications systems, and more particularly, to methods and apparatus for supporting high Quality of Service (QoS) end point (EP) devices, e.g. using a satellite gateway when terrestrial gateways are insufficient.

BACKGROUND

Some Internet of Things/Long Range Wide Area Network (IoT/LoRaWAN) devices in a communications network will typically not be reachable via terrestrial gateways (GWs). For example some ground level sensor devices, e.g., some smart parking devices and/or some utility (water/gas/electric) meter devices, can be hard to reach from terrestrial GWs. Some customers need high QoS to ensure no or very low frame loss of sensitive information, e.g., fire/police, customers in utility, customers in critical infrastructure monitoring, etc., ensuring that each the frames sent by the devices and sensors will be recovered by the customer backend application.

Typically in a communications network, e.g., an IoT network, there will be locations that are inaccessible for the terrestrial gateways in the network. In addition due to varying levels or interference and/or loading at different time the level of QoS available via terrestrial GWs may vary.

Based on the above, there is a need for new methods and apparatus to provide better connectivity for end point devices, e.g. IoT EP devices.

SUMMARY

Methods and apparatus for providing continuous connectivity to an end point (EP) device, e.g. a high QoS Internet of Things (IoT) EP device, are described. An exemplary communications network, e.g. an Internet-of-Things, communications network, in which end point (EP) devices, e.g., IoT EP devices, communicate with a network server via terrestrial gateways, further includes satellite gateways. The satellite gateways supplement the terrestrial gateways, providing a communications path for high QoS EP devices, when the terrestrial GWs are insufficient to provide the desired level of QoS. Various embodiments of the present invention are well suited for facilitating high QoS communications, e.g. no lost packets or a very low packet loss rate, for emergency responder applications and/or other high priority applications. Various embodiments of the present invention are also well suited for use by devices, e.g., IoT devices, situated in locations, e.g., remote locations which are not reachable by a terrestrial gateway and/or locations corresponding to poor channel conditions with regard to terrestrial gateways, and for which installation of an additional terrestrial GW to provide additional connectivity or to improve QoS is not feasible and/or is not financially viable.

In some embodiments, a high QoS EP device attempts to establish reliable communications with a network server via terrestrial gateways, e.g. using an adaptive datarate (ADR) approach including transmitting data packets and monitoring for acknowledgments in or more receive windows corresponding to the terrestrial gateways. If the ADR fails with regard to being able to use a terrestrial GW, then the high QoS EP device enters a satellite compatible mode of operation, e.g., in which the high QoS EP device transmits at a TX power level corresponding to maximum range and monitors an additional receive window corresponding to satellite GWs for acknowledgments (ACKs), in addition to monitoring the one or more receive windows corresponding to terrestrial GWs.

Terrestrial gateways forward received packets from both low QoS and high QoS EP devices to a network server. Satellite gateways forward received packets from only high QoS EP devices to the network server. The network server which aggregates forwarded packets from the terrestrial and/or satellite gateways, which correspond to a EP device, recognizes that a particular high QoS device is not able to sends its packets via terrestrial GWs, decides to use a satellite GW for the downlink to the identified high QoS EP device and tells the satellite GW to send ACKs to the high QoS EP device.

An exemplary communications method implemented by an end point (EP) device, in accordance with some embodiments, comprises: operating the EP device to attempt to communicate, while operating in a terrestrial mode of operation, with a network server via one or more terrestrial gateways, said attempt to communicate including transmitting a packet; monitoring a first set of downlink receive windows for an acknowledgment from a terrestrial gateway following the transmission of said packet; determining, from a failure to receive an acknowledgement of the packet transmitted during said terrestrial mode of operation that communications via only terrestrial gateways at a desired data rate is not possible; and in response to determining that communications via only terrestrial gateways at a desired data rate is not possible switching into a satellite compatible mode of operation.

An exemplary communications method, in accordance with some embodiments, includes: receiving, at a network server, a first set of forwarded packets, said forwarded packets originating from a first end point device and being forwarded by one or more gateways; and determining, at the network server, if any packet in the first set of packets was received and forwarded by a satellite gateway without also being received and forwarded by a terrestrial gateway; and taking a transmission acknowledgement action based on said determining.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 7B is a second part of a flowchart of an exemplary method of operating a network server in accordance with an exemplary embodiment.

FIG. 7 comprises the combination of FIG. 7A and FIG. 7B.

DETAILED DESCRIPTION

Figure 1:
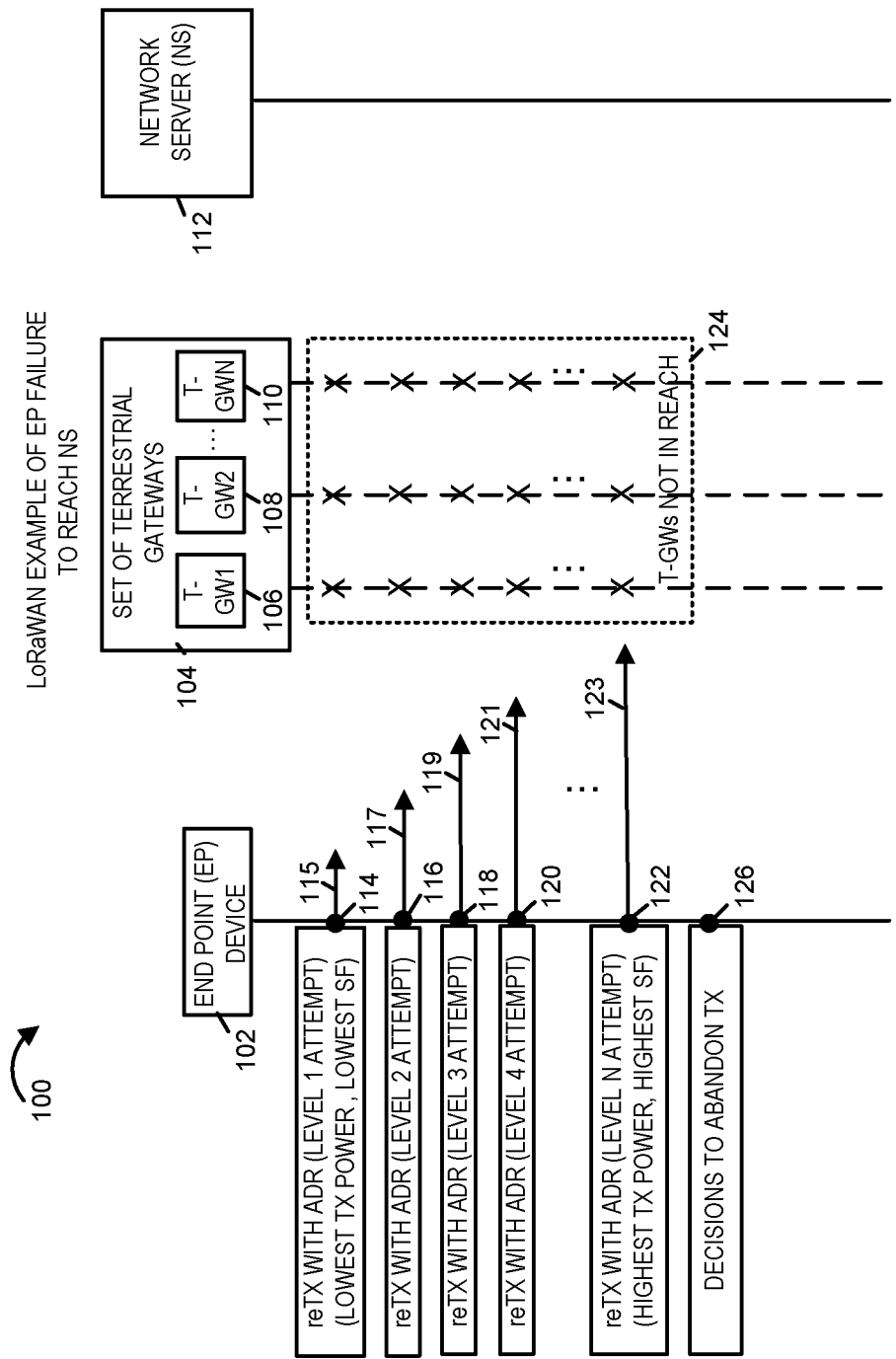
FIG. 1 is drawing illustrating an end point (EP) device, e.g., an IoT EP device, implementing an adaptive data rate (ADR) re-transmission algorithm, failing to reach a network server (NS) due to failure to establish a reliable connection with a terrestrial gateway.

FIG. 1 is drawing 100 illustrating a network, e.g. a LoRaWAN network, operations in which an end point (EP) device, implementing an adaptive data rate (ADR) re-transmission (re-TX) algorithm, fails to reach a network server (NS). Drawing 100 includes an exemplary end point (EP) device 102, a set of conventional terrestrial gateways 104 and a network server (NS) 112. The set of conventional terrestrial gateways includes terrestrial gateway 1 (T-GW 1) 106, terrestrial gateway 2 (T-GW 2) 108, . . . , terrestrial gateway N (T-GW N) 110.

In step 114 EP device 102 performs a level 1 reTX attempt with ADR, which transmits signals 115, e.g., conveying packets and/or a frame, at the lowest transmission (TX) power level and lowest spreading factor (SF). Transmitted signals 115 fail to reach any of the terrestrial GWs (106, 108, . . . , 110). In step 116 EP device 102 performs a level 2 reTX attempt with ADR, which transmits signals 117, e.g., conveying the packets and/or the frame, at the next level. In each successive level at least one of transmission power and spreading factor is higher than in the previous level. Transmitted signals 117 also fail to reach any of the terrestrial GWs (106, 108, . . . , 110).

In step 118 EP device 102 performs a level 3 reTX attempt with ADR, which transmits signals 119, e.g., conveying the packets and/or the frame, at the next level. Transmitted signals 119 also fail to reach any of the terrestrial GWs (106, 108, . . . , 110).

In step 120 EP device 102 performs a level 4 reTX attempt with ADR, which transmits signals 121, e.g., conveying the packets and/or the frame, at the next level. Transmitted signals 121 also fail to reach any of the terrestrial GWs (106, 108, . . . , 110).

In step 122 EP device 102 performs a level N reTX attempt with ADR, which transmits signals 123, e.g., conveying the packets and/or the frame, at the next level. Transmitted signals 123 also fail to reach any of the terrestrial GWs (106, 108, . . . , 110).

Thus, the re-TX attempt signals have not reached any of the T-GWs (106, 108, 110), as indicated by dotted box 124 with X's corresponding to each failure to reach a GW. If a GW had received and successfully recovered a packet or frame which was transmitted by the EP 102, the GW would have forwarded the packet or frame to the network server 112. Since none of the packets or frames which were transmitted, as part of the ADR re-transmission attempts, were successfully recovered by the GWs, none of the packets or frames reached the network server 112. Thus no ACKs were generated and sent back to the EP 102, by the NS 112.

In step 126, the EP 102, having failed to receive any ACKs, decides to abandon TX, e.g., for the current time. The EP 102 may attempt transmission at a later point in time.

Figure 2:
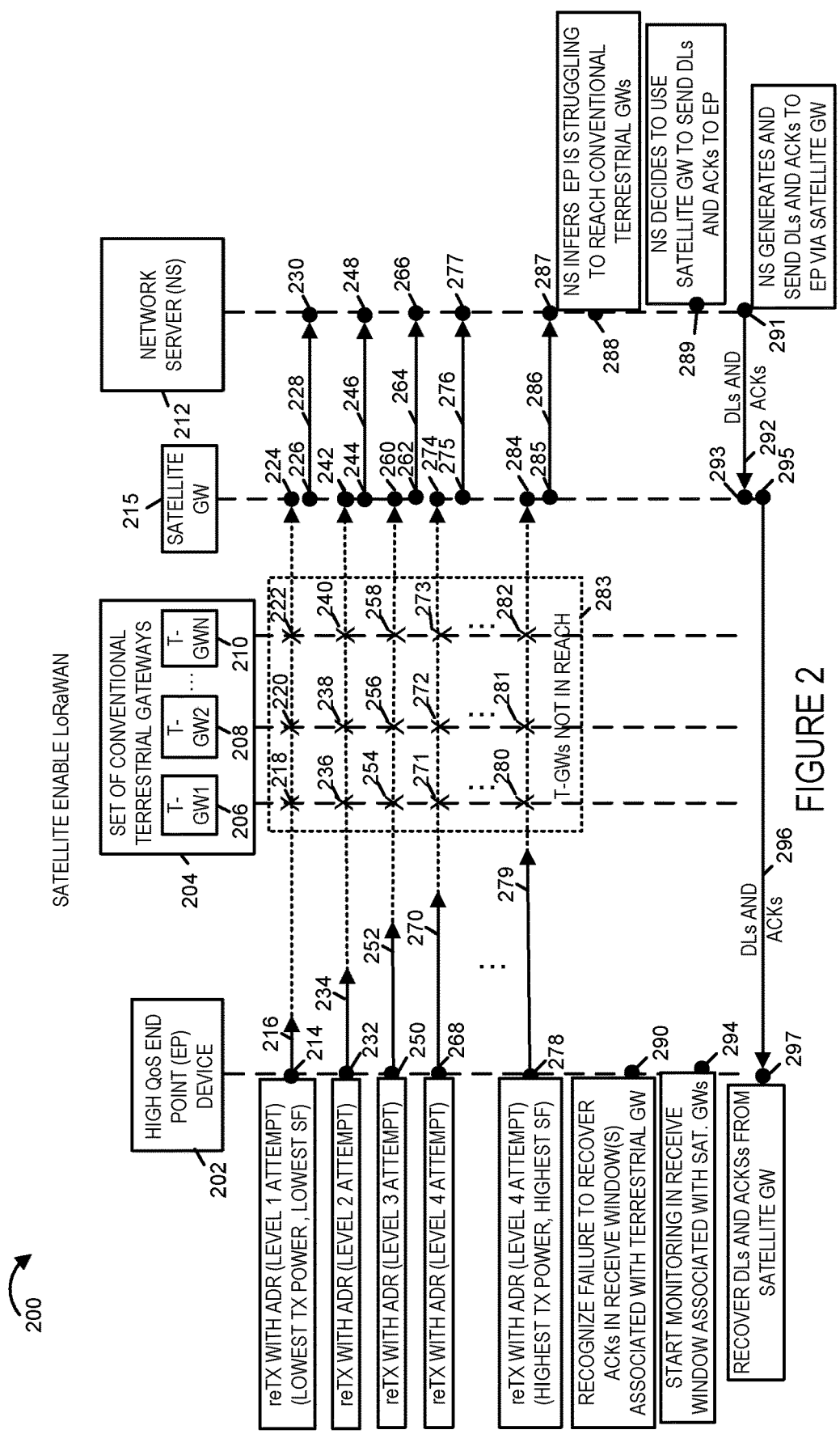
FIG. 2 is drawing illustrating an exemplary satellite enabled network in which an end point device, e.g. high QoS EP device implementing ADR, may, and sometimes does, communicate with a network server via a satellite gateway, e.g., when a reliable link with a terrestrial gateway can not be established, in accordance with an exemplary embodiment.

FIG. 2 is drawing 200 illustrating an exemplary satellite enabled network, e.g., LoRaWAN, in accordance with an exemplary embodiment. Drawing 200 includes an exemplary high Quality of Service (QoS) end point (EP) device 202, a set of terrestrial gateways 204, a satellite gateway 215, and a network server (NS) 112, which are part of a communications network, e.g., a LoRaWAN IoT communications network, implemented in accordance with an exemplary embodiment. The set of terrestrial gateways includes terrestrial gateway 1 (T-GW 1) 206, terrestrial gateway 2 (T-GW 2) 208, . . . , terrestrial gateway N (T-GW N) 210.

In step 214 EP device 202 performs a level 1 reTX attempt with ADR, which transmits signals 216, e.g., conveying packets and/or a frame, at the lowest transmission (TX) power level and lowest spreading factor (SF). Transmitted signals 216 fail to reach any of the terrestrial GWs (206, 208, . . . , 210), as indicated by Xs (218, 220, 222), respectively. However, in step 224 signals 216 are successfully received and recovered by satellite GW 215. In step 226 satellite GW 215 generates and sends message 228, conveying, e.g. forwarding, recovered packets and/or a frame from received signals 216, along with metadata, e.g., including satellite GW ID information, to network server 212. In step 230 network server 212 receives message 228 and recovers the communicated information.

In step 232 EP device 202 performs a level 2 reTX attempt with ADR, which transmits signals 234, e.g., conveying the packets and/or the frame, at the next level. In each successive level at least one of transmission power and spreading factor is higher than in the previous level. Transmitted signals 234 fail to reach any of the terrestrial GWs (206, 208, . . . , 210), as indicated by Xs (236, 238, 240), respectively. However, in step 242 signals 234 are successfully received and recovered by satellite GW 215. In step 244 satellite GW 215 generates and sends message 246, conveying, e.g. forwarding, recovered packets and/or a frame from received signals 234, along with metadata, e.g., including satellite GW ID information, to network server 212. In step 248 network server 212 receives message 246 and recovers the communicated information.

In step 250 EP device 202 performs a level 3 reTX attempt with ADR, which transmits signals 252, e.g., conveying the packets and/or the frame, at the next level. Transmitted signals 252 fail to reach any of the terrestrial GWs (206, 208, . . . , 210), as indicated by Xs (254, 256, 258), respectively. However, in step 260 signals 252 are successfully received and recovered by satellite GW 215. In step 262 satellite GW 215 generates and sends message 264, conveying, e.g. forwarding, recovered packets and/or a frame from received signals 252, along with metadata, e.g., including satellite GW ID information, to network server 212. In step 266 network server 212 receives message 264 and recovers the communicated information.

In step 268 EP device 202 performs a level 4 reTX attempt with ADR, which transmits signals 270, e.g., conveying the packets and/or the frame, at the next level. Transmitted signals 270 fail to reach any of the terrestrial GWs (206, 208, . . . , 210), as indicated by Xs (271, 272, 273), respectively. However, in step 274 signals 250 are successfully received and recovered by satellite GW 215. In step 275 satellite GW 215 generates and sends message 276, conveying, e.g. forwarding, recovered packets and/or a frame from received signals 270, along with metadata, e.g., including satellite GW ID information, to network server 212. In step 277 network server 212 receives message 276 and recovers the communicated information.

In step 278 EP device 202 performs a level N reTX attempt with ADR, which transmits signals 279, e.g., conveying the packets and/or the frame, at the highest TX power level and highest SF. Transmitted signals 279 fail to reach any of the terrestrial GWs (206, 208, . . . , 210), as indicated by Xs (280, 281, 282), respectively. Thus, the re-TX attempt signals have not reached any of the T-GWs (206, 208, . . . , 210), as indicated by dotted box 283 with X's corresponding to each failure to reach a GW. However, in step 284 signals 279 are successfully received and recovered by satellite GW 215. In step 285 satellite GW 215 generates and sends message 286, conveying, e.g. forwarding, recovered packets and/or a frame from received signals 279, along with metadata, e.g., including satellite GW ID information, to network server 212. In step 287 network server 212 receives message 286 and recovers the communicated information.

In step 288 network server 212 infers that EP device 202 is struggling to reach conventional terrestrial GWs (206, 208, . . . 210), e.g., by not having received any of the packets or frames sent in signals (216, 234, 252, 270, 279) via forwarding thru T-GWs (206, 208, . . . , 210), and by having received the packets and frames via the satellite GW 215. In step 289 the network server (NS) 212 decides to use satellite GW 215 to send downlinks (DLs) and ACKs to EP 202.

In step 290 EP device 202 recognizes a failure to recovers ACKs in receive windows associated with the terrestrial gateways.

In step 291 NS 212 generates and sends message 292, including DL signal information including ACKs intended to be delivered to EP device 202, to satellite GW 215, e.g., via a communications path including a ground station and an uplink between the ground station and satellite GW 215. In step 293, satellite GW 215 receives message 292 and recovers the communicated information.

In step 294 EP device 202 starts monitoring in a receive window associated with satellite GWs including satellite GW 215. In step 295, satellite GW 215 generates and sends downlink wireless signals 296, conveying the DL information including ACKs, to EP device 202. In step 297 EP device 202 receives signals 296 and recovers the downlink data and information including ACKs from the satellite GW 215.

In the example of FIG. 2, it is shown that each of the high QoS EP device 200 transmission signals (216, 234, 252, 270, 279), corresponding to different ADR levels, do not reach any of the terrestrial GWs (206, 208, . . . 210), but do successfully reach the satellite GW 215. In many embodiments, one or more high power transmissions reach the satellite GW, but lower power transmissions do not, e.g., only TX signals 279 transmitted at the highest power level and highest SF (corresponding to maximum range) reach satellite GW 215.

Figure 3:
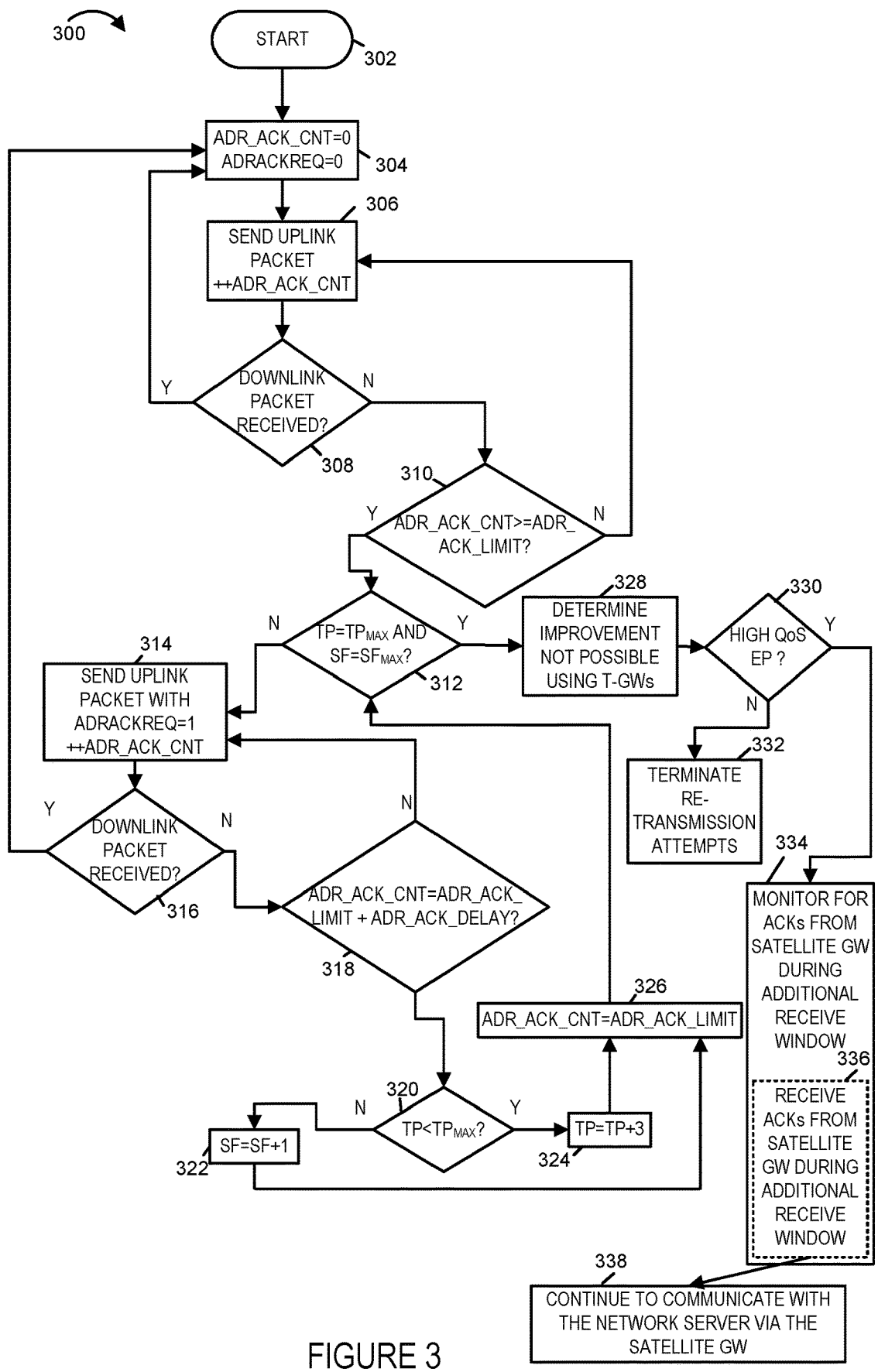
FIG. 3 is a flowchart illustrating an exemplary adaptive data rate (ADR) mechanism as part of an exemplary communications specification, e.g., a LoRaWAN specification, supporting both terrestrial GWs and satellite GWs, in accordance with an exemplary embodiment.

FIG. 3 is a flowchart 300 illustrating an exemplary adaptive data rate (ADR) mechanism as part of an exemplary communications specification, e.g., a LoRaWAN specification or another protocol specification supporting both terrestrial GWs and satellite GWs, in accordance with an exemplary embodiment. The ADR mechanism aims to provide a fairly reliable and battery-friendly connectivity by adapting spreading factor (SF) and transmit (TX) power (TP) to changes in link conditions. Both end points (EPs) and the network play an important role in the process. If an end device (ED), sometimes referred to as an end point (EP) or end point (EP) device, observes that a large number of consecutive uplink transmissions are not followed by a downlink response from the network, the ED assumes lost connectivity and resolves this issue by gradually stepping up its TP to the maximum before doing the same for SF. These measures gradually improve the robustness of the link. Flowchart 300 illustrates the operation of EPs including the use of satellite GWs, in addition to terrestrial GWs, for high QoS EP devices, e.g., an EP device subscribing to a high QoS level which makes use of satellite GWs in addition to terrestrial GWs, and includes an additional receive window corresponding to satellites, e.g., for downlink including ACKs, when terrestrial GWs are not reliable or not possible.

The two parameters, namely, ADR_ACK_LIMIT and ADR_ACK_DELAY control the number of uplink messages, after which if a downlink response is not received, an end device (ED) must either increase transmit power (TP) or spreading factor (SF). The value of these parameters along with the network size, deployment environment, and the amount of link fluctuations, all affect the time to converge to a state where ED is able to successfully re-establish a reliable link to the network.

In the case, where the ED is unable to establish a reliable link to the network using terrestrial GWs, if the ED is a high QoS device, a satellite GW, with a corresponding additional receive window, is used to try to establish a reliable link to the network.

In step 302 the end device (ED) is powered on and initialized. In some embodiments, in step 302 the transmit power (TP) and the spreading factor (SF) are both set at the lowest level. Operation proceeds from step 302 to step 304. In step 304, the counter variable ADR_ACK_CNT is set equal to 0, and the control bit ADRACKREQ, e.g., which is included in a header of a transmitted message, is set equal to 0. Operation proceeds from step 304 to step 306.

In step 306 the ED sends, e.g., transmits via wireless signals, an uplink packet and increments the counter variable ADR_ACK_CNT. Operation proceeds from step 306 to step 308. In step 308 the ED determines if a downlink packet has been received, e.g. during one or more receive (RX) windows corresponding to terrestrial gateways, said downlink packet being sourced from a network server and sent via a terrestrial gateway.

If the determination of step 308 is that a downlink packet has been received, then operation proceeds from step 308 to step 304, in which the ED sets the ADR_ACK_CNT to 0 and sets the control bit ADRACKREQ to 0. Operation proceeds from step 302 to step 304.

Alternatively, if the determination of step 308 is that a downlink packet has not been received, then operation proceeds from step 308 to step 310, in which the ED determines if ADR_ACK_CNT is greater than or equal to ADR_ACK_LIMIT. In one example ADR_ACK_LIMIT is 20. If the value of ADR_ACK_CNT is not greater than ADR_ACK_LIMIT, then operation proceeds from step 310 to step 306; otherwise, operation proceeds from step 310 to step 312.

In step 312 the ED determines if TP=TPmax and SF=SFmax. If the ED determines that TP=TP max and SF=SF max, then operation proceeds from step 312 to step 320; otherwise, operation proceeds from step 312 to step 314. In step 314 the ED sends the uplink packet with ADRACKREQ=1, signifying the ED expects an ACK to the transmitted packet. In step 314 the ED also increments the current value of the counter ADR_ACK_CNT. Operation proceeds from step 314 to step 316.

In step 316 the ED determines if a downlink packet has been received, e.g. during one or more receive (RX) windows corresponding to terrestrial gateways, said downlink packet being sourced from a network server and sent via a terrestrial gateway.

If the determination of step 316 is that a downlink packet has been received, then operation proceeds from step 316 to step 304, in which the ED sets the ADR_ACK_CNT to 0 and sets the control bit ADRACKREQ to 0. Operation proceeds from step 302 to step 304.

Alternatively, if the determination of step 316 is that a downlink packet has not been received, then operation proceeds from step 316 to step 318, in which the ED determines if ADR_ACK_CNT equals ADR_ACK_LIMIT+ADR_ACK_DELAY. In one example ADR_ACK_DELAY is 5. If the value of ADR_ACK_CNT is does not equal ADR_ACK_LIMIT+ADR_ACK_DELAY, then operation proceeds from step 318 to step 314; otherwise, operation proceeds from step 316 to step 320.

In step 320 the ED determines if TP is less than TPmax. Of the determination of step 320 is that TP is less than TPmax, then operation proceeds from step 320 to step 324; otherwise, operation proceeds from step 320 to step 322.

In step 324, the ED sets TP=TP+3, e.g., which increases the TP by a step of 3 units, 3 dB or 3 dBm. In other embodiments, a value other than 3 is used for incrementing the TX power level to be used. Operation proceeds from step 324 to step 326. In step 326 the ED sets the counter ADR_ACK_CNT=ADR_ACK_LIMIT. Thus the ACK_CNT is set back to the ADR_ACK_LIMIT to allow ACK_LIMIT more TX attempts at the new power level setting. Operation proceeds from step 326 to step 312.

In step 322, the ED sets SF=SF+1. Thus the spreading factor is incremented by one level. Operation proceeds from step 322 to step 326. In step 326 the ED sets the counter ADR_ACK_CNT=ADR_ACK_LIMIT. Thus the ACK_CNT is set back to the ADR_ACK_LIMIT to allow ACK_LIMIT more TX attempts at the new SF level setting. Operation proceeds from step 326 to step 312.

Returning to step 328, in step 328 the ED determines that improvement is not possible using terrestrial gateways (T-GWs), as the ADR has attempted a set of ADR_ACK_DELAY (e.g., 5) transmissions at the maximum TX power level and maximum spreading factor and has not received an ACK from a terrestrial GW. Operation proceeds from step 330.

In step 330, if the ED is a high QoS EP, then operation proceeds from step 330 to step 334; otherwise, operation proceeds from step 330 to step 332. In step 332 the ED, which is not a high QoS device, terminates re-transmission attempts, e.g., for the time being. In step 334, the ED, which is a high QoS device, monitors for ACKs from a satellite GW during an additional receive window, corresponding to satellite GWs. In step 336, ED receives ACKs from the satellite gateway. Operation proceeds from the step 336 to step 338. In step 338 the ED continues to communicate with the network server via the satellite GW, e.g., transmitting uplink signals at max TX power and max SF, and continuing to monitor for downlink signals during the additional receive window corresponding to the satellite GW.

Figure 4:
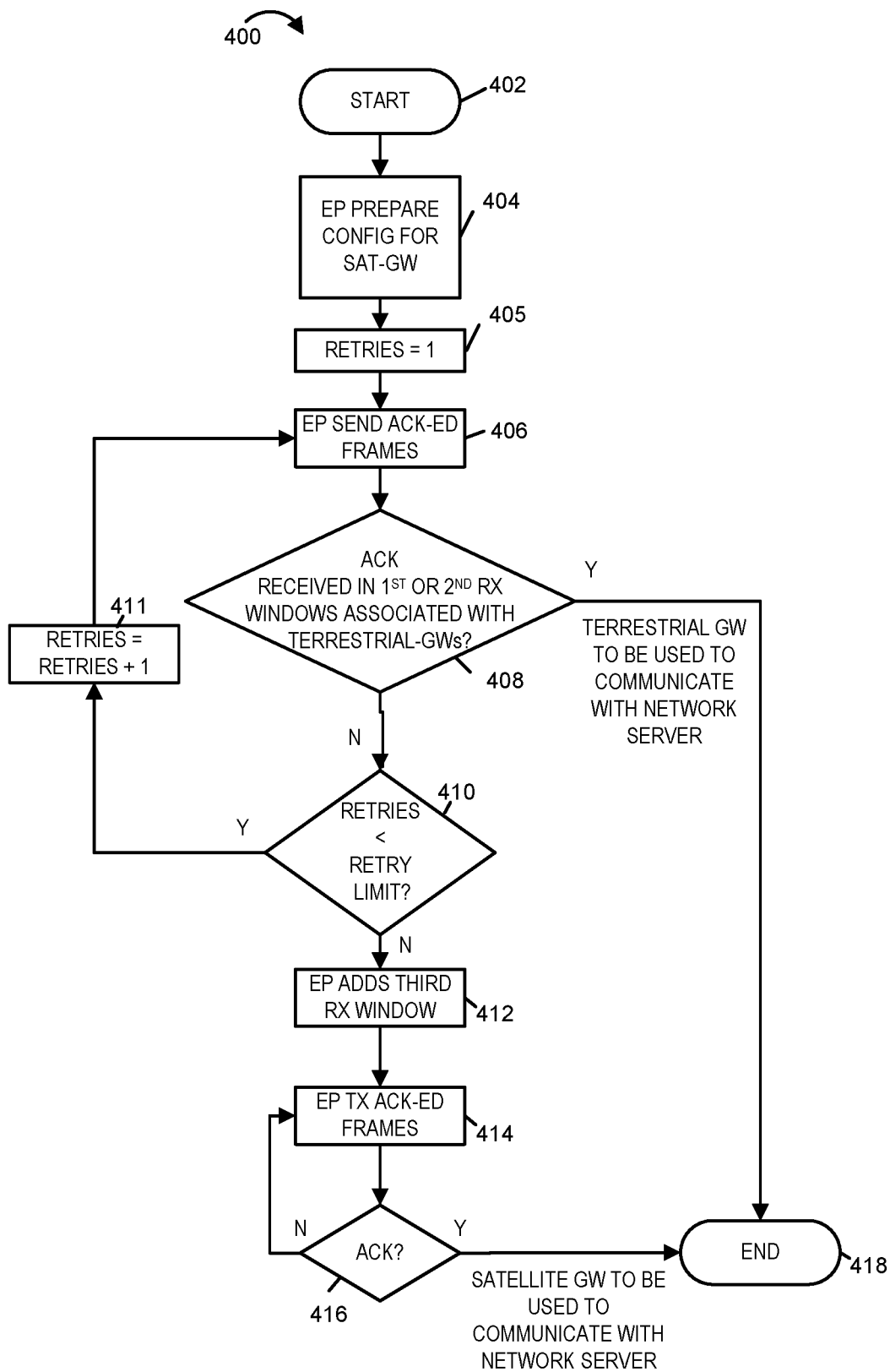
FIG. 4 is a flowchart of an exemplary method of operating an end point (EP) device, e.g., a high QoS EP device, in accordance with an exemplary embodiment.

FIG. 4 is a flowchart 400 of an exemplary method of operating an end point (EP) device, e.g., a high QoS EP device, in accordance with an exemplary embodiment. In some embodiments the start state for initiating flowchart 400 is that the network, e.g., LoRaWAN, has failed to deliver an ACK-ed frame. The exemplary method starts in step 402 and proceeds to step 404. In step 404 the EP prepares its configuration for satellite gateway (SAT-GW) communications. In various embodiments, in step 404, the EP prepares for very long range communications by setting its TX power to maximum and the DataRate to minimum to ensure longest possible range, e.g. TX power=TXmax, and Spreading Factor (SF)=SFmax (which corresponds to the minimum data rate). Operation proceeds from step 404 to step 405.

In step 405 the EP device sets the counter variable RETRIES equal to 1. Operation proceeds from step 405 to step 406.

In step 406 the EP sends ACK-ed frames. For example in step 406 the EP sends frames with ADRACKREQ control bit set equal to 1 in its header, signifying ACK is being requested. Operation proceeds from step 406 to step 408. In step 408 the EP monitors for ACKs in one or more receive (RX) windows associated with terrestrial GWs. If an ACK is received in step 408, then operation proceeds to end step 418, since a reliable link with a terrestrial GW has been established, and it is not necessary, at the current time to use a link with a satellite GW. However, if an ACK is not received in step 408, then operation proceeds from step 408 to step 410.

In step 410 the EP checks if the number of retries (represented by the value of variable RETRIES) is greater than the value of RETRY LIMIT. In one embodiment, the value of RETRY LIMIT 5 and step 410 checks if step 406 been performed 5 or more times. In some embodiments, the value of RETRY LIMIT is the same as the value of ADR_ACK_DELAY, e.g., as in FIG. 3. In some embodiments, the value of RETRY LIMIT is an integer value in the range of 1 to 20. If the determination is that retries is less than RETRY LIMIT, then operation proceeds from step 410 to step 411. In step 411 the value of the counter RETRIES is incremented by one. However, if the determination of step 410 is that the value of RETRIES is not less than RETRY LIMIT, then operation proceeds from step 410 to step 412.

In step 412 the EP adds a 3rd RX window. Operation proceeds from step 412 to step 414. In step 414 the EP transmits ACK-ed frames. Operation proceeds from step 414 to step 416. In step 416 the EP monitors for ACKs for satellite-GWs, e.g. in the third RX window. If an ACK is received, e.g., via the third RX window, then operation proceeds to end step 418, as a communications link has been established with the network via a Satellite GW. However, if an ACK is not received in step 416, then operation proceeds to step 414 to transmit additional ACK-ed frames.

An overview of the method of flowchart 400 FIG. 4 will now be described. The EP prepares for very long range communications by setting (step 404) TX power to maximum and DataRate to minimum to ensure the longest possible range.

In set of steps (406, 408, 410, 411) the EP tries reaching the terrestrial GWs (T-GWs) RETRY LIMIT times, e.g., 5, times using a conventional re-transmission (re-TX) approach used with terrestrial GWs, e.g., a conventional LoRaWAN ADR approach.

The EP attempts to reach the network via T-GWs are expected to eventually fail, but in the unlikely event of success (e.g., ACK received during an iteration of step 408), then the satellite GW is not needed to handle this RX, and communications between the EP and network server will be done through a terrestrial GW (T-GW).

However, consider the more likely scenario that re-Transmission (re-TX) attempts fail with respect to terrestrial GWs. At this stage EP frames, (being transmitted in iterations of step 406) are reaching the satellite GW and the satellite GW is forwarding each of the received uplinks (e.g., corresponding to high QoS EPs) to the network server (NS). The NS will see that re-TX (frames) are coming from the EP via the satellite GW and the network server understands, e.g. based on frames from the EP (same content frames) not being received and forwarded via one or more terrestrial GWs, that the EP is unable to reach the terrestrial GWs, and thus communications between the EP and the network server via a terrestrial GW are currently not possible.

After RETRY LIMIT attempts, e.g., 5, reTX attempts, the EP, in step 412 will add a 3rd RX window (novel additional RX window to monitor for ACKs) after a first predetermined time, e.g. 10 seconds, and will switch to RX continuous for a second predetermined time, e.g. 10 seconds. Thus the EP attempts to receive ACKs from a satellite GW during this 3rd RX window, which is a third monitoring window.

The EP in step 414 sends ACK-ed frames until it receives in step 416 an ACK from the satellite GW, e.g. during the third monitoring window. After the ACK is received from the satellite gateway communications between the EP and network server will be performed via the satellite GW.

Figure 5:
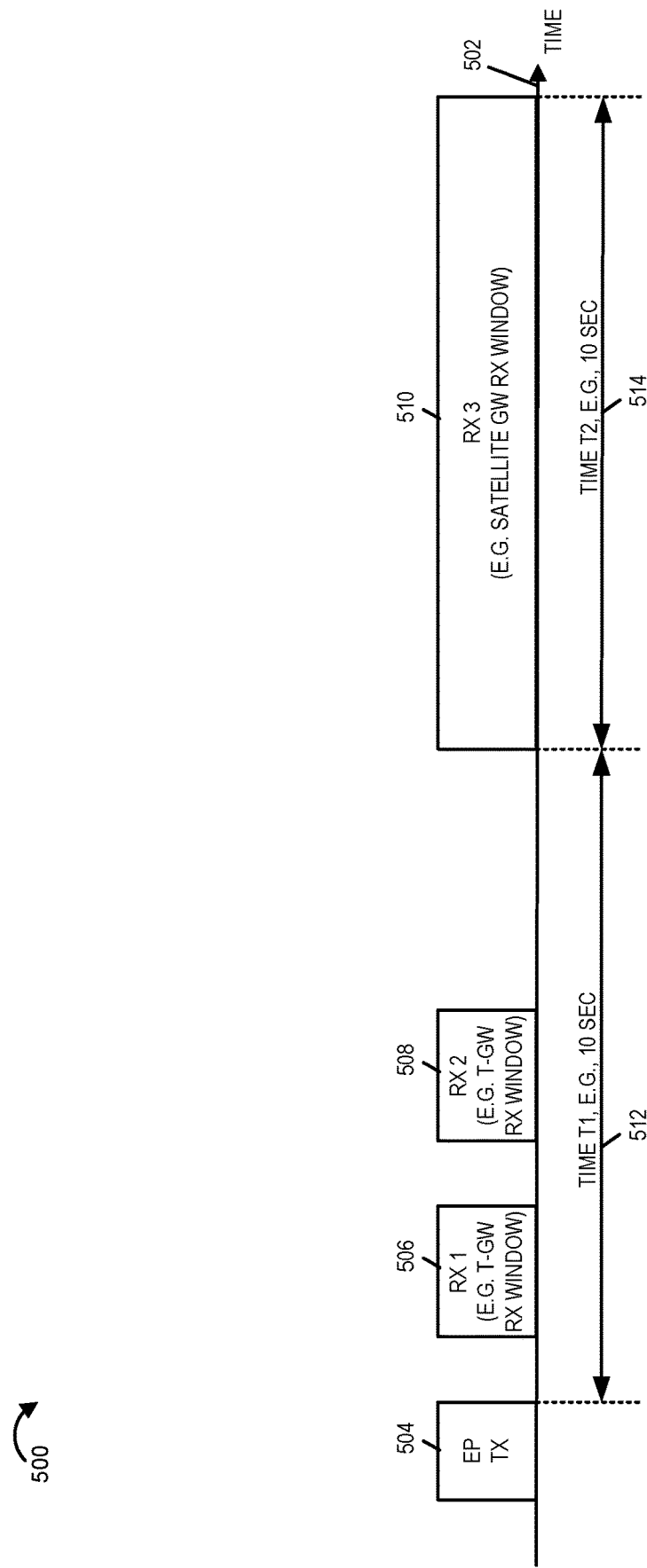
FIG. 5 is a drawing illustrating an exemplary transmission by a High QoS EP device and exemplary corresponding receive windows, in which the EP device looks for downlink signals including acknowledgments, said receive windows including one or more receive windows associated with terrestrial GWs and an additional receive window associated with satellite gateways, in accordance with an exemplary embodiment.

FIG. 5 is a drawing 500 illustrating an exemplary transmission by a High QoS EP device and exemplary corresponding receive windows, in which the EP device looks for downlink signals including acknowledgments. Horizontal axis 502 represents time. Block 504 represents an EP UL transmission (TX). Receive (RX) window 1 (RX1) 506 represents a first receive window in which the EP device monitors for an ACK in response to the EP TX 504. Receive (RX) window 2 (RX2) 508 represents a second receive window in which the EP device monitors for an ACK in response to the EP TX 504. Receive (RX) window 3 (RX3) 508 represents a third receive window in which the EP device monitors for an ACK in response to the EP TX 504. First and second receive windows (RX1 504, RX2 506) correspond to terrestrial GWS, while third receive window (RX3 510) corresponds to satellite GWs. There is a first delay time T1 512, e.g. 10 seconds, between the end of EP TX 504 and the start of the third receive window RX 3 510. The duration of the third receive window is time interval T2 514, e.g. 10 seconds. The actual values selected for T1 and T2 are based on: i) the expected range of distances between the high QoS EP and the satellite, and ii) the expected range of distances between the satellite and a ground base station. In some embodiments different values for T1 and T2 are used depending upon whether the satellites are LEO satellites or MEO satellites.

Figure 6:
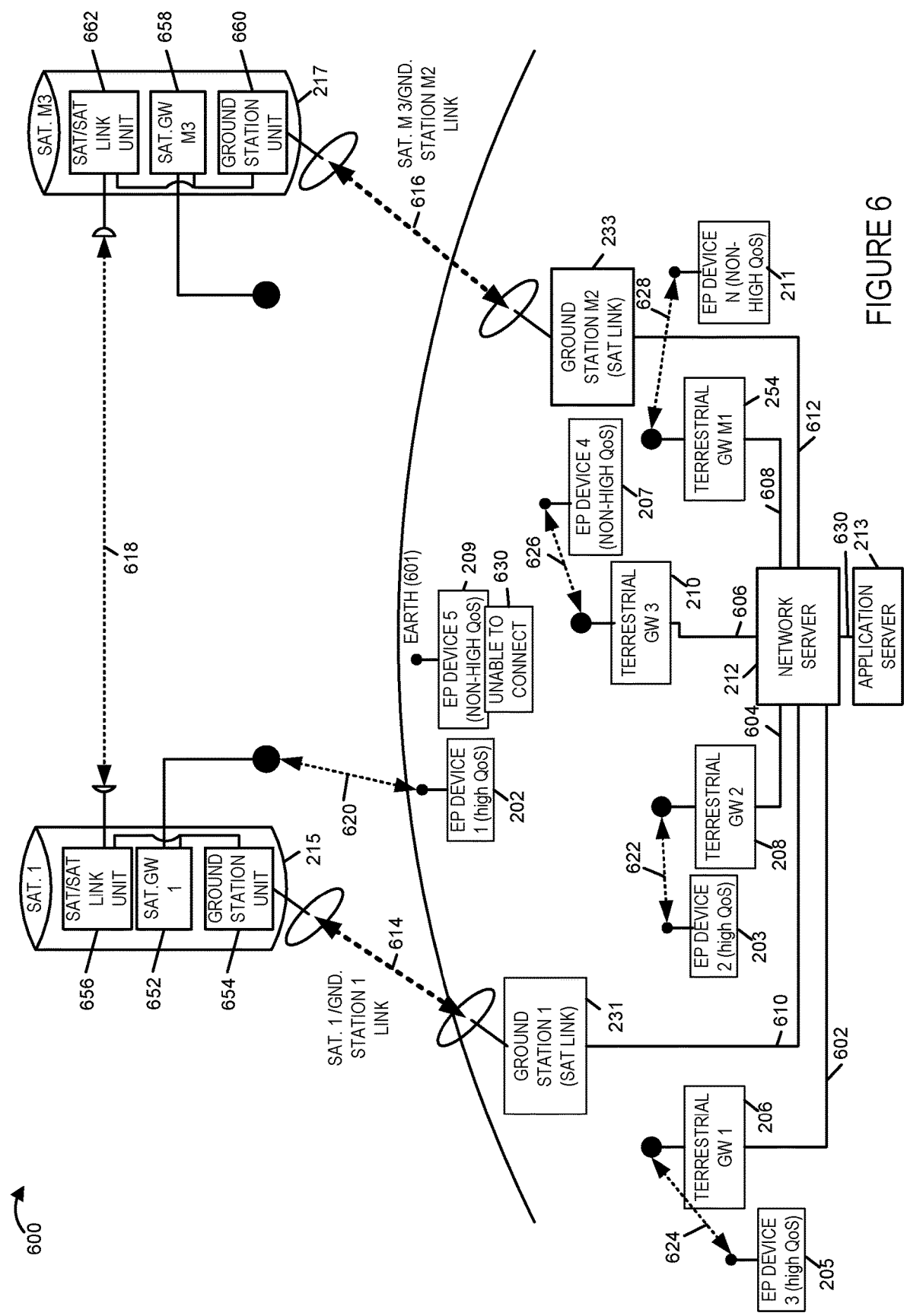
FIG. 6 is a drawing of an exemplary communications system including end point devices, e.g. IoT end point devices, terrestrial gateways, satellite gateways and a network server in accordance with an exemplary embodiment.

FIG. 6 is a drawing of an exemplary communications system 600 in accordance with an exemplary embodiment. Exemplary communications system 600 includes a plurality of end point (EP) devices (EP device 1 202, EP device 2 203, EP device 3 205, EP device 4 207, EP device 5 209, . . . , EP device N 211), a plurality of terrestrial Gateways (terrestrial GW 1 206, terrestrial GW 2 208, terrestrial GW 3 210, . . . , terrestrial GW M1 254), a plurality of ground stations (ground station 1 231, . . . , ground station M2 233), a network server 212, and an application server 213 located on the earth 601. The terrestrial gateways (terrestrial GW 1 206, terrestrial GW 2 208, terrestrial GW 3 210, . . . , terrestrial GW M1 254) are coupled to the network server 212 via communications links (602, 604, 606, . . . , 608), respectively. The ground stations (ground station 1 231, . . . , ground station M2 233) are coupled to the network server 212 via communications links (610, . . . , 612), respectively. In some embodiments, one or more of the terrestrial gateways and/or ground stations is coupled to the network server 212 via the Internet. Network server 212 is coupled to application server 213 via communications link 630.

Exemplary communications system 600 further includes a plurality of satellites (satellite 1 215, . . . , satellite M3 217). In one embodiment the satellites (215, . . . , 217) are low earth orbit (LEO) satellites. In another embodiment, the satellites (215, . . . , 217) are medium earth orbit (MEO) satellites. Satellite 1 215 includes satellite 1 GW 652, ground station unit 654, and satellite/satellite link unit 656. Satellite M3 217 includes satellite GW M3 658, ground station unit 660, and satellite/satellite link unit 662.

Satellite 1 215 is coupled to ground station 1 231 via sat. 1/ground station 1 link 614. Satellite M3 217 is coupled to ground station M2 232 via sat. M3/ground station M2 link 616. At a different time the satellites (215, 217) may be coupled to other ground stations than those shown in FIG. 6. Satellite/satellite communications link 618 couples satellite 1 215 to satellite M3 217. In some embodiments, a first satellite may be unable to communicate directly with a ground station, and thus the first satellite communicates via the satellite to satellite link to a second satellite, which is able to communicate with a ground station. Thus a satellite can remain coupled to the network server 212 via a ground station, whether or not the satellite is able to communicate directly with a ground station.

EP device 1 202, which is a high QoS device, has failed to establish a reliable link with a terrestrial GW, but EP device 1 202 has a established communications link 620 with satellite GW 1 652 of satellite 1 215. EP device 2 203, which is a high QoS device, has established a reliable communications link 622 with terrestrial GW 2 208. EP device 3 205, which is a high QoS device, has established a reliable communications link 624 with terrestrial GW 1 206. EP device 4 207, which is a non-high QoS device, has established a reliable communications link 626 with terrestrial GW 3 210. EP device 5 209, which is a non-high QoS device, has been unable to connect with a terrestrial GW as indicated by box 630 and is not allowed access via satellite GWs since it is not a high QoS device.

In some embodiments, the satellite GWs (satellite GW 1 652, . . . , satellite GW M3 658) use the same channel plans, frequencies and parameters as the terrestrial GWs (terrestrial GW 1 206, terrestrial GW 2 208, terrestrial GW 3 210, . . . terrestrial GW M1.254). The constellation of satellites (satellite 1 215, . . . , satellite M3.217) along with ground stations (ground station 1 231, . . . ground station M2.233) are additions to a terrestrial network. The network server 212 is configured to implement steps of an exemplary method in accordance with the present invention, e.g., the method of flowchart 700 of FIG. 7 and/or steps described with respect to FIG. 2. High QoS devices, e.g., devices (202, 203, 205) are configured to implement steps of an exemplary method in accordance with the present invention, e.g., the method of flowchart 300 of FIG. 3, flowchart 400 of FIG. 4, and/or flowchart 800 of FIG. 8, and/or steps described with respect to FIG. 2.

Figure 7A:
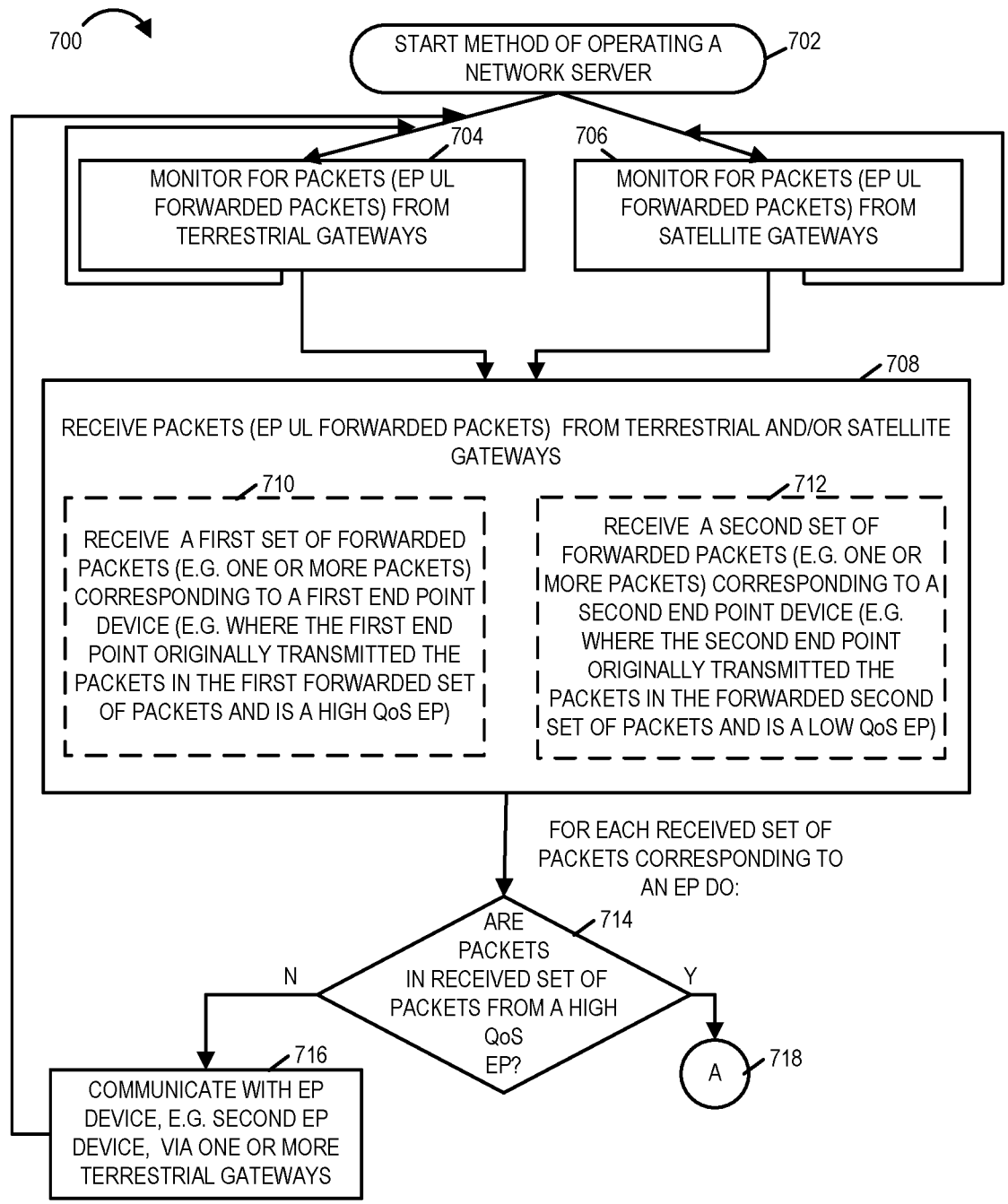
FIG. 7A is a first part of a flowchart of an exemplary method of operating a network server in accordance with an exemplary embodiment.

FIG. 7, comprising the combination of FIG. 7A and FIG. 7B, is a flowchart 700 of an exemplary method of operating a network server, e.g., network server 212, in accordance with an exemplary embodiment. Operation starts in step 702 in which the network server is powered on and initialized. Operation proceeds from step 702 to steps 704 and 706. In step 704 the network server monitors for packets (EP UL forwarded packets) from terrestrial gateways. In step 706 the network server monitors for packets (EP UL forwarded packets) from satellite gateways. In some embodiments, satellite GWs forward received EP UL packets corresponding to high QoS EPs, but no not forward received EP UL packets corresponding to low QoS EPs. Operation proceeds from steps 704 and 706 to step 708.

In step 708 the network server receives packets (EP UL forwarded packets) from terrestrial and/or satellite gateways (GWs). Step 708 includes one or both of steps 710 and 712. In step 710 the network server receives a first set of forwarded packets (e.g., one or more packets) corresponding to a first end point (EP) device, e.g. where the first EP device originally transmitted the packets in the first forwarded set of packets and is a high QoS EP device.

In step 712 the network server receives a second set of forwarded packets (e.g., one or more packets) corresponding to a second end point (EP) device, e.g. where the second EP device originally transmitted the packets in the forwarded second set of packets and is a low QoS EP device.

Operation proceeds from step 708 to step 714 for each set of packets corresponding to an EP device. In step 714 the network device checks and determines if the packets in the received set of packets are from a high QoS EP device. If the determination is that the packets in the received set of packets are from a high QoS EP device, then operation proceeds from step 714, via connecting node A 718 to step 720. However, if the determination is that the packets in the received set of packets are not from a high QoS device, then operation proceeds from step 714 to step 716. In step 716 the network server communicates with the EP device, e.g., second EP device, via one or more terrestrial gateways.

In step 720 the network server determines if any packet in the set of packets, e.g., first set of received packets, was received and forwarded by a satellite gateway without also being received and forwarded by a terrestrial gateway. In some embodiments, step 720 includes step 722 in which the network server determines if each of the packets in the received set of forwarded packets corresponding to the high QoS EP device are being successfully received and forwarded by at least one terrestrial GW.

If the determination of step 720 is that a packet in the set of packets, e.g., first set of received packets, was received forwarded by a satellite gateway without also being received and forwarded by a terrestrial gateway, then operation proceeds from step 720 to step 732.

However, if the determination of step 722 is that each of the packets in the received set of forwarded packets corresponding to the high QoS device was successfully received and forwarded to the network server by at least one terrestrial gateway, then operation proceeds from step 722 to step 724.

In step 724 the network server communicates with the EP device via one or more terrestrial gateways. Step 724 includes steps 726, 728 and 730. In step 726 the network server determines to use a terrestrial gateway, e.g. a first terrestrial gateway, to send downlink signals to the first high QoS EP device. In step 728 the network server sends a command to the first terrestrial gateway to transmit at least one ACK in response to the received set of packets. In step 730 the network server optionally transmits additional downlink data to the EP device, e.g., to the first EP device via only terrestrial GW(s).

In step 732 the network server communicates with the EP device via at least one satellite gateway, e.g., a first satellite GW, from which a forwarded packet was received. Step 732 includes steps 734, 736 and 738. In step 734 the network server determines to use at least one satellite gateway, e.g. a first satellite gateway, from which forwarded packets were received, to send downlink signals to the first high QoS EP device. In step 736 the network server sends a command to the at least one satellite gateway, e.g. first satellite gateway, to transmit ACKs in response to the received set of packets. In step 738 the network server optionally transmits additional downlink data to the EP device, e.g. the first EP device, via satellite gateway, and in some embodiments, optionally to terrestrial gateways(s).

Figure 8A:
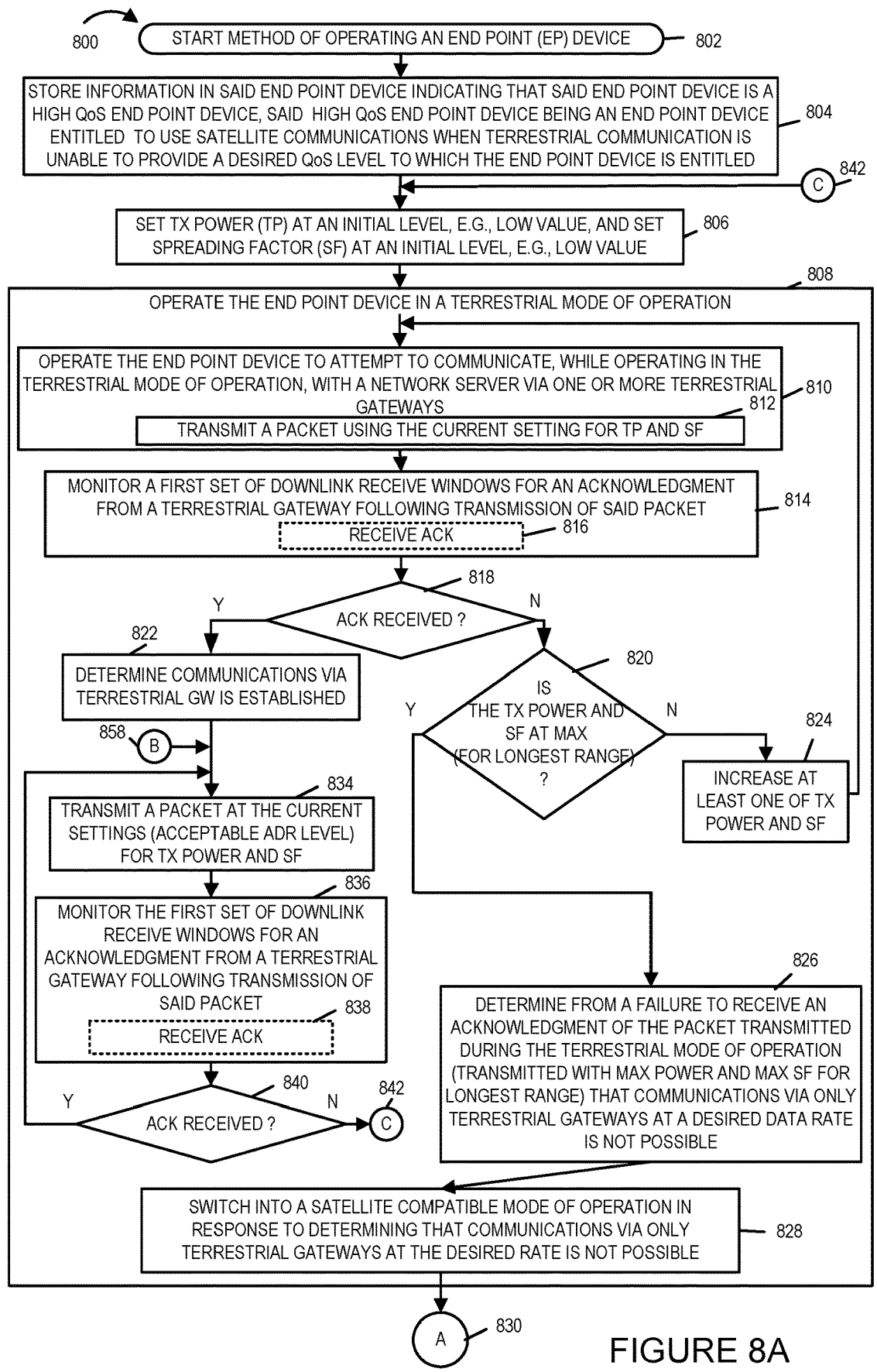
FIG. 8A is a first part of flowchart of an exemplary method of operating an end point (EP) device, e.g., a high QoS Internet of Things (IoT) EP device, in accordance with an exemplary embodiment.
Figures 8, 8A, 8B:
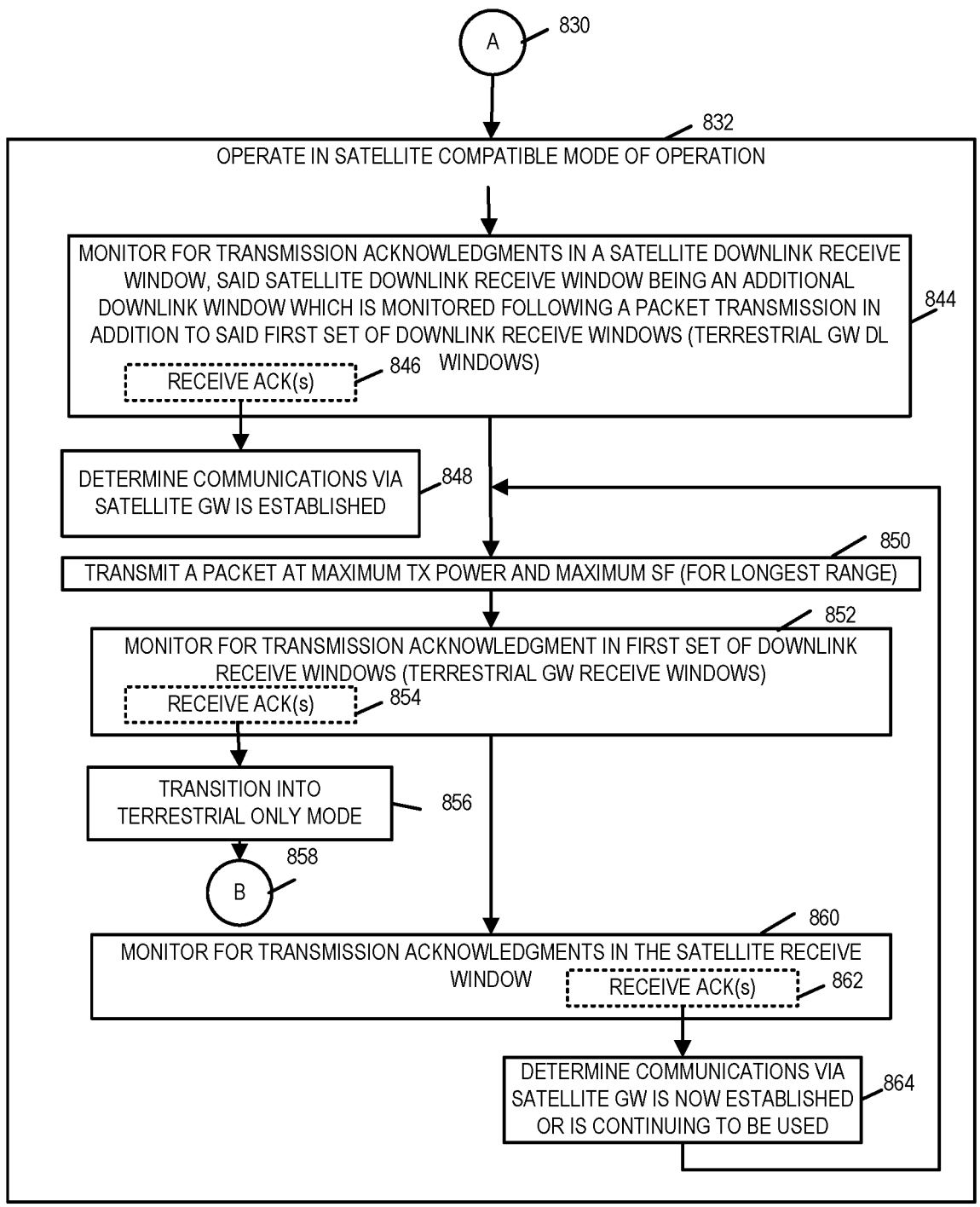
FIG. 8B is a second part of flowchart of an exemplary method of operating an end point (EP) device, e.g., a high QoS Internet of Things (IoT) EP device, in accordance with an exemplary embodiment.
FIG. 8 comprises the combination of FIG. 8A and FIG. 8B.

FIG. 8 is a flowchart 800 of an exemplary method of operating an end point (EP) device, e.g., an Internet of Things (IoT) EP device, e.g., a high QoS IoT EP device, in accordance with an exemplary embodiment. The EP device implementing the method of flowchart 800 is, e.g., one of high QoS EP devices (202, 203, 205) of system 600 of FIG. 6. Operation starts in step 802 in which the EP device is powered on and initialized. Operation proceeds from start step 802 to step 804.

In step 804, the EP device stores information in the EP device indicating that the EP device is a high QoS EP device, said high QoS EP device being an end point device entitled to use satellite communications when terrestrial communications is unable to provide a desired QoS level to which the EP is entitled. Operation proceeds from step 804 to step 806.

In step 806 the EP device sets its transmit (TX) power (TP) at an initial level, e.g., a low value, and sets spreading factor (SF) at an initial level, e.g., a low value. In some embodiments, in step 806 the EP device sets TP at the lowest level and sets SF at the lowest level. Operation proceeds from step 806 to step 808.

In step 806 the EP device is operated in a terrestrial mode of operation. Step 808 includes steps 810, 812, 814, 816, 818, 820, 822, 824, 826, 828, 834, 836, 838, and 840.

In step 808 the EP device attempts to communicate, while operating in a terrestrial mode of operation, with a network server via one or more terrestrial gateways. Step 810 includes step 812 in which the EP device transmits a packet using the current setting for transmit power (TP) and spreading factor (SF). Operation proceeds from step 810 to step 814.

In step 814 the EP device monitors a first set of downlink receive windows (e.g., one or more receive windows associated with terrestrial gateways) for an acknowledgment from a terrestrial gateway following transmission of said packet. Step 814 may, and sometimes does include step 816 in which the EP device receives an acknowledgment. Operation proceeds from step 814 to step 818.

In step 818, if the EP device received an acknowledgment during the monitoring of step 814, then operation proceeds to step 822, in which the EP device determines that communications via a terrestrial GW is established. Operation proceeds from step 822 to step 834 in which the EP device transmits a packet at the current settings for TX power and SF (an acceptable ADR level for terrestrial communications based on the received ACK from a terrestrial GW. Operation proceeds from step 834 to step 836. In step 836 the EP device monitors the first set of downlink receive windows for an acknowledgment from a terrestrial gateway following transmission of said packet in step 834. Step 838 may, and sometimes does include step 838 in which the EP device receives an acknowledgment in response to the packet transmission of step 834, from a terrestrial gateway. Operation proceeds from step 836 to step 838.

In step 838, if an acknowledgment was received during the monitoring of step 836, then operation proceeds from step 840 to step 834, for transmission of another packet. However, if an acknowledgment was not received in step 840, then the attempt at terrestrial communications has failed at the current ADR level, and operation proceeds from step 840, via connecting node C 842 to step 806.

Returning to step 818, alternatively, in step 818, if the EP has not received an acknowledgement during the monitoring of step 814, then operation proceeds to step 820. In step 820, the EP device checks if the current setting for TX power (TP) and current setting for spreading factor (SF) are at maximum (for longest range).

If the current settings for TP and SF are not at maximum (corresponding to longest range), then operation proceeds from step 820 to step 824. However, if the current settings for TP and SF are at maximum, then operation proceeds from step 820 to step 826.

In step 824 the EP device increases at least one of TX power (TP) and spreading factor (SF). Thus, the EP device has a new setting for at least one of TP or SF. In some embodiments during each iteration of step 824 an adaptive data rate (ADR) level is changed by one step. Operation proceeds from step 824 to step 810, in which the EP device attempts to communicate, while operating in terrestrial mode, with one or more terrestrial gateways, said attempt to communicate including step 812 in which the EP device transmits a packet at the current TX power and SF settings.

Returning to step 826, in step 826 the EP device determines from a failure to receive and acknowledgement of the packet transmitted during the terrestrial mode of operation (e.g., transmitted with maximum power and maximum SF for longest range) that communications via only terrestrial gateways at the desired data rate is not possible. Operation proceeds from step 826 to step 828. In step 828 the EP device switches into a satellite compatible mode of operation in response to determining that communications via only terrestrial gateways at the desired rate is not possible. Operation proceeds from step 828 via connecting node A 830 to step 832.

In step 832 the EP device is operated in satellite compatible mode of operation. Step 832 includes steps 844, 846, 848, 850, 852, 854, 856, 860, 862 and 864. In step 844 the EP device monitors for transmission acknowledgments in a satellite receive window, said satellite downlink receive window being an additional downlink receive window which is monitored following a packet transmission in addition to said first set of downlink windows (e.g., terrestrial gateway DL receive windows). Step 844 may, and sometimes does, include step 846 in which the EP device receives an acknowledgment(s) during the satellite downlink receive window. In response to the received acknowledgment of step 844 operation proceeds to step 848 in which the EP device determines that communications via a satellite gateway is established.

Operation proceeds from step 844 to step 850, in which the EP device transmits a packet at maximum transmit (TX) power and maximum SF (e.g., for longest range). Operation proceeds from step 850 to step 852. In step 852, the EP device monitors for transmission acknowledgment in the first set of receive windows (e.g., terrestrial GW receive windows). Step 852 may, and sometimes does include step 854, in which the EP device receives an ACK from a terrestrial GW. The EP device, is not expected to detect an ACK from a terrestrial GW, however, conditions may have changed, e.g., channel conditions may have recently improved, e.g., due to removal of an obstruction between the EP device and a terrestrial GW or movement of the EP device, and the EP device may detect an ACK. Operation proceeds from step 854 to step 856, in which the EP device is operated to transition into terrestrial only mode. Operation proceeds from step 856, via connecting node B 858, to step 834.

Returning to step 852, operation proceeds from step 852 to step 860. In step 860, assuming the monitoring of step 852 has not detected an ACK and transitioned into terrestrial mode, then operation proceeds from step 852 to step 860. In step 860 the EP device monitors for transmission acknowledgment in the satellite receive window. Step 860 may, and generally does, include step 862 in which the EP device receive an acknowledgement(s) from a satellite GW. Operation proceeds from step 862 to step 864, which the EP device determines that communications via the satellite GW is now established or is continuing to be received. During the monitoring of step 860, the EP device may, and sometimes does, also receive and recover other downlink signals in addition to the acknowledgment.

Operation proceeds from step 864 to step 850, in which the EP device transmits another packet at maximum transmit power and maximum SF (for longest range).

In some embodiments, multiple transmission attempts, e.g., 5 transmission attempts, are performed at an ADR level while in terrestrial mode, e.g. before switching to another ADR level in response to failure. In some embodiments, multiple transmission attempts, e.g., 5 transmission attempts, are performed at the maximum range ADR level while in terrestrial mode, before determining that terrestrial communications has failed, and transitioning to satellite compatible mode. Thus in some embodiments, the EP device gets multiples chances to successfully ACK a packet in each of one or more ADR levels before deciding that terrestrial mode is unacceptable.

In some embodiments, in satellite compatible mode, the EP device transmits multiple iterations of the same packet or set of packets successively, e.g., 5 iterations, or 10 iterations or more, before expecting to receive an acknowledgment response from a satellite gateway in the satellite GW receive window, e.g., due to the expected long round trip time when using satellite communications.

Figure 9:
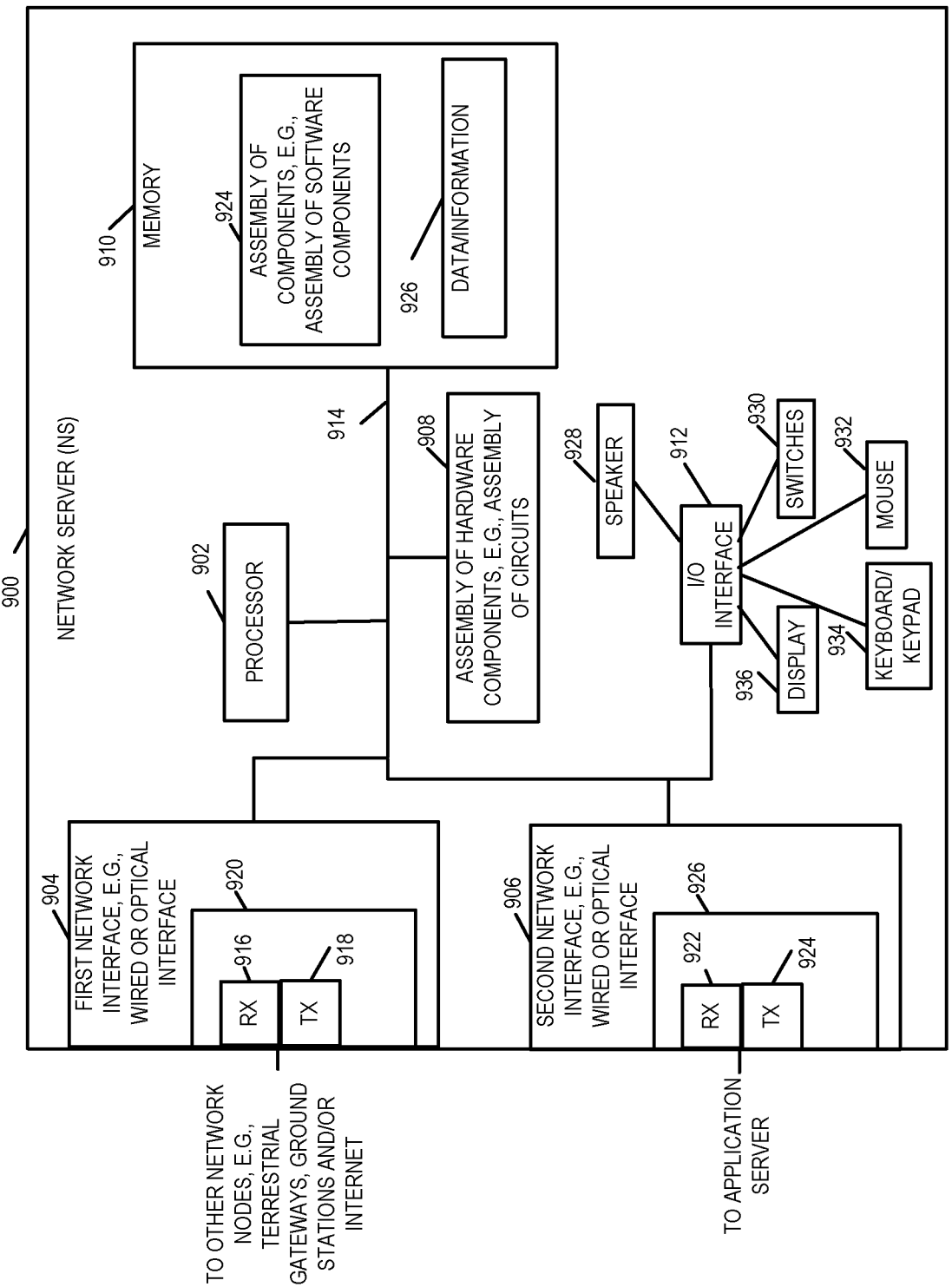
FIG. 9 is a drawing of an exemplary network server in accordance with an exemplary embodiment.

FIG. 9 is a drawing of an exemplary network server (NS) 900 in accordance with an exemplary embodiment. Exemplary network server 900 is, e.g., NS 212 of system 600 of FIG. 6 and/or a network server implementing steps of flowchart 700 of FIG. 7 and/or steps described with respect to the signaling diagram of FIG. 2.

Network server 900 includes a processor 902, e.g., a CPU, a first network interface 904, e.g., a wired or optical interface, a second network interface 906, e.g., a wired or optical interface, an assembly of hardware components 908, e.g., an assembly of circuits, memory 910, and I/O interface 912 coupled together via a bus 914 over which the various elements may interchange data and information. Network server 900 further includes a speaker 928, switches 930, mouse 932, keyboard/keypad 934, and display 936 coupled to I/O interface 914 via which the various I/O devices (928, 930, 932, 934, 936) are coupled to the bus 914 and other elements on the bus.

First network interface 904 includes a receiver (RX) 916 and a transmitter (TX) 918. In some embodiments receiver 916 and transmitter 918 are included as part of a transceiver 920. First network interface 904 couples the network server 900 of other network nodes, e.g. terrestrial gateways, ground stations, etc., and/or the Internet. Forwarded packets sourced from EP devices are received via receiver 916. Acknowledgments and downlink data/information, which is intended to be delivered to an EP device, is sent via transmitter 918, e.g., to a terrestrial GW which will provide DL and transmit to the EP device or to a ground station, to be sent to a satellite including a satellite GW, which will provide a DL to the EP device. Second network interface 906 includes a receiver (RX) 922 and a transmitter (TX) 924. In some embodiments receiver 922 and transmitter 924 are included as part of a transceiver 926. Second network interface 906 couples the network server 900 to an application server (AS), e.g. AS 213. In some embodiments, a single network interface is used instead of first and second network interfaces.

Memory 910 includes an assembly of components 924, e.g., an assembly of software components, and data/information 926. Exemplary data/information 926 includes, e.g., received forwarded packets from terrestrial and/or satellite gateways, e.g., including sensor and/or user data, e.g., to be sent to an application server, aggregated set of packets corresponding to an EP device, information identifying which EP devices are high QoS EP devices and which EP devices are not high QoS EP devices, ADR information corresponding to each EP device being serviced, information indicating which gateway is to be used for downlink to each EP device, information indicating a current mode of operation for a high QoS device, e.g., terrestrial only mode or satellite enhanced mode.

Figure 10:
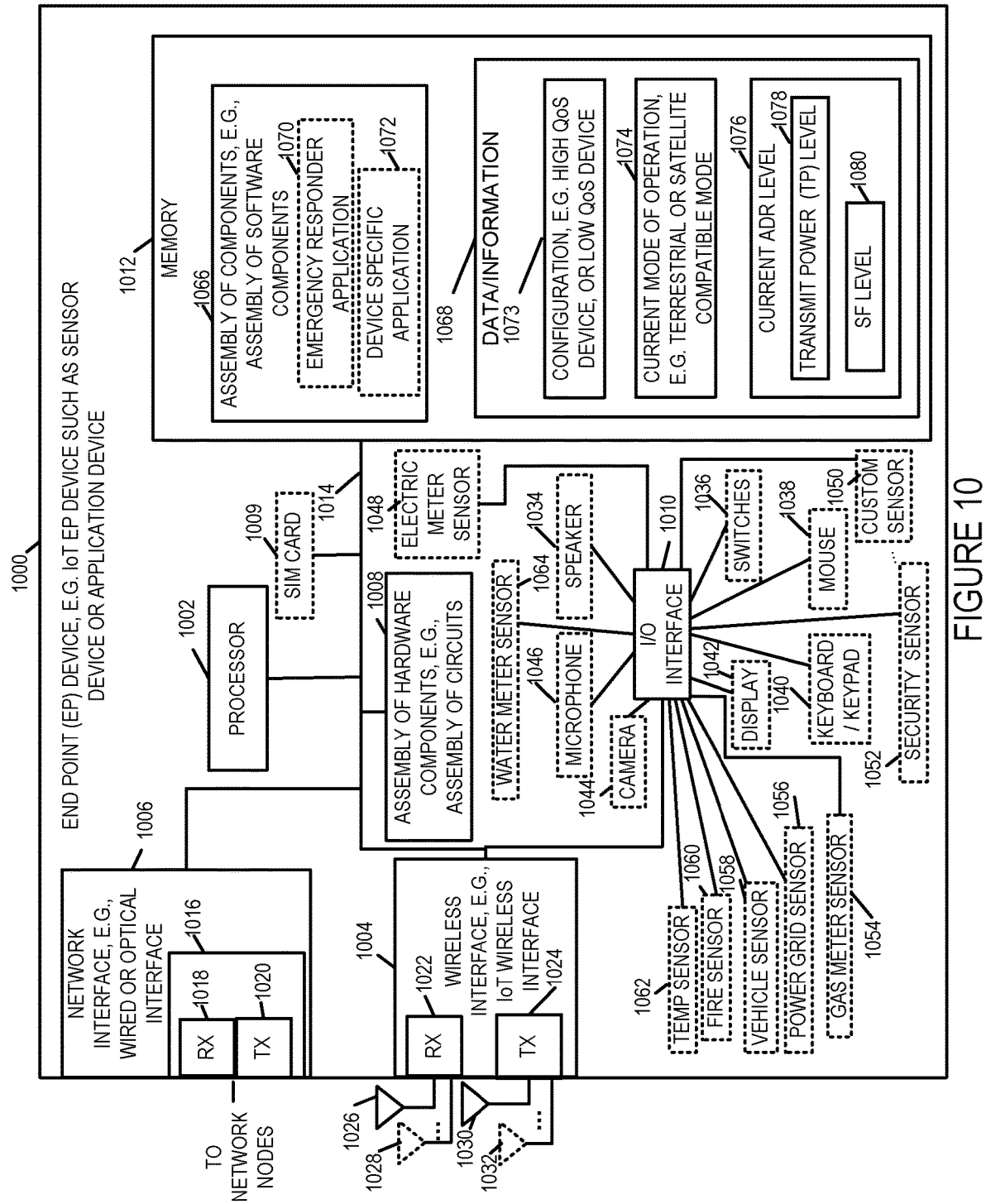
FIG. 10 is a drawing of an exemplary end point device, e.g., an IoT EP device such as a sensor device or application device, in accordance with an exemplary embodiment.

FIG. 10 is a drawing of an exemplary end point (EP) device 1000, e.g., an Internet of Things (IoT) EP device such as a sensor device or application device, in accordance with an exemplary embodiment. Exemplary EP device 1000 is, e.g., one of the EP devices (EP device 1 202, EP device 2 203, EP device 3 205, EP device 4 207, EP device 5 209, ..., EP device N 211) of system 600 of FIG. 6, and/or a EP device implementing steps of the method of flowchart 800 of FIG. 8 and/or steps of signaling diagram of FIG. 2 and/or steps of the method of flowchart 300 of FIG. 3 and/or steps of the method of flowchart 400 of FIG. 4.

EP device 1000 includes a processor 1002, e.g., a CPU, a wireless interface 1004, e.g., an IoT wireless interface, a network interface 1006, e.g., a wired or optical interface, an assembly of hardware components 1008, e.g., an assembly of circuits, an I/O interface 1010, memory 1012, and, in some embodiments, a subscriber identity module (SIM) card 1009 coupled together via a bus 1014 over which the various elements may interchange data and information. EP device 1000 further includes one or more or all of: a speaker 1034, switches 1036, mouse 1038, keyboard/keypad 1040, display 1042, camera 1044, microphone 1046, electric meter sensor 1048, custom sensor 1050, security sensor 1052, gas meter sensor 1054, power grid sensor 1056, vehicle sensor 1058, fire sensor 1058, temperature sensor 1062, and water meter sensor 1064 coupled to I/O interface 1010 via which the various I/O devices (1034, 1036, 1038, 1040, 1042, 1044, 1046, 1048, 1050, 1052, 1054, 1056, 1058, 1060, 1062, 1064) are coupled to the bus 1010 and other elements on the bus.

Wireless interface 1004 includes a wireless receiver (RX) 1022 and a wireless transmitter (TX) 1024. Wireless receiver 1022 is coupled to one or more receive antennas (1026, ..., 1028), via which the EP device receives wireless signals, e.g., IoT wireless signals, from terrestrial and/or satellite gateways. Wireless transmitter 1024 is coupled to one or more transmit antennas (1030, ..., 1032), via which the EP device 1000 transmits wireless signals, e.g., IoT wireless signals intended to be received by terrestrial and/or satellite gateways which are within reception range. In some embodiments, the same antenna or antennas are use for transmit and receive.

Network interface 1006 includes a receiver (RX) 1018 and a transmitter (TX) 1020. In some embodiments receiver 1018 and transmitter 1020 are included as part of a transceiver 1016. Network interface 1006 may, and sometimes does, couples the EP device 1000 to network nodes.

Memory 1012 includes an assembly of components 1066, e.g., an assembly of software components, and data/information 1068. In some embodiments, assembly of component 1066 includes an emergency response application 1070 and/or one or more device specific applications 1072, e.g., a custom sensor application, a security sensor application, a gas meter application, a power grid sensor application, a vehicle sensor application, a fire sensor application, a temperature sensor application, a water meter sensor application, etc. Data/information 1068 includes configuration information 1073, e.g. information identifying the EP device as a high QoS device and configuration information corresponding to the high QoS device, e.g., information identifying first and second RX windows (associated with terrestrial GWs) and a third RX window (associated with satellite GWs), maximum transmit power setting, and low data rate setting (max TP and low data rate for achieving maximum range) or information identifying the EP device as a non-high QoS device and configuration information corresponding to the non-high QoS device, e.g., information identifying one of a plurality of low QoS alternative levels, and information identifying first and second receive windows (associated with terrestrial GWs). Data/information 1068 further includes a current mode of operation 1074, e.g., terrestrial or satellite compatible mode, and current ADR level 1076 including a transmit power (TP) level 1078 and a spreading factor (SF) level 1080.

Figure 11:
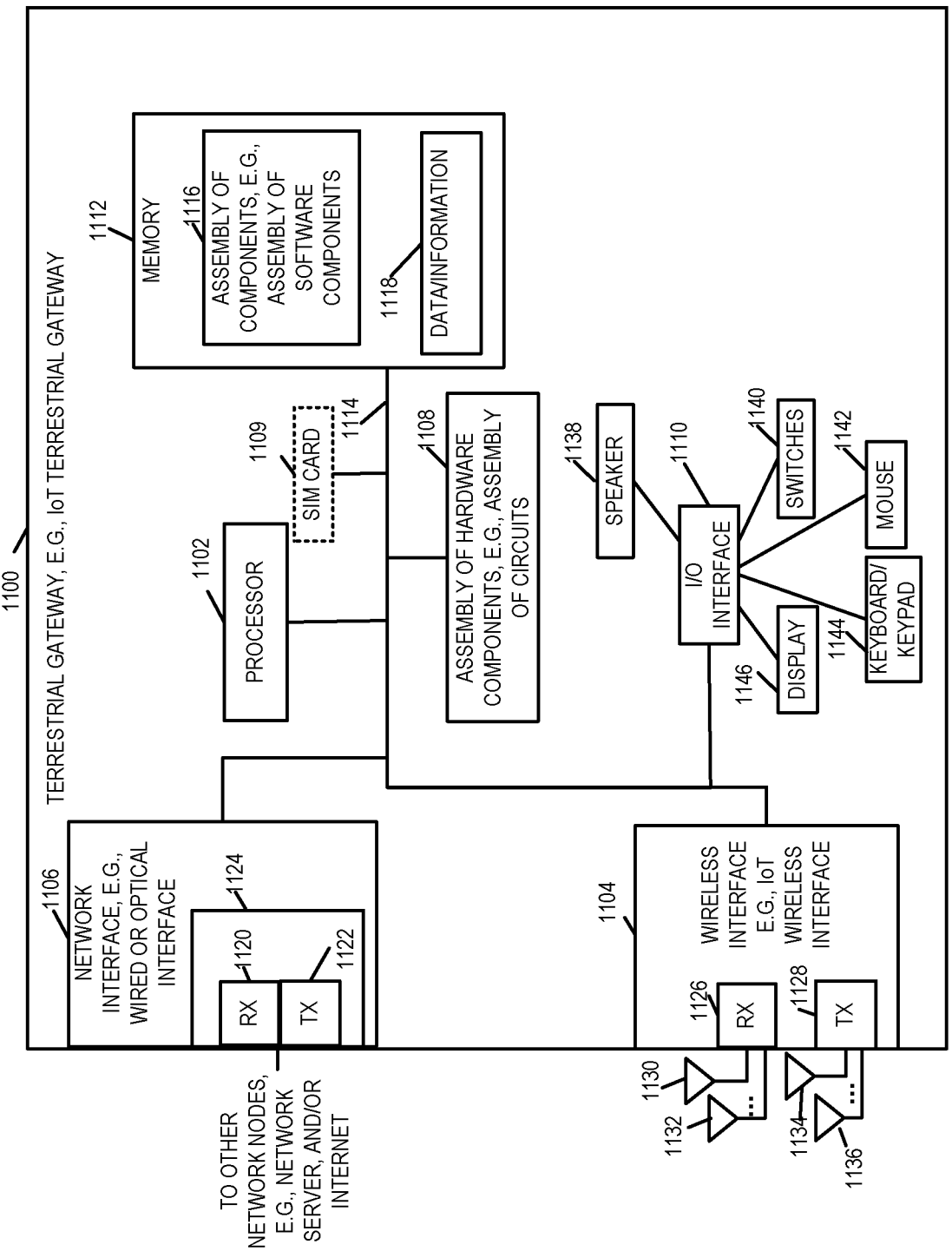
FIG. 11 is a drawing of an exemplary terrestrial gateway, e.g., an IoT terrestrial gateway, in accordance with an exemplary embodiment.

FIG. 11 is a drawing of an exemplary terrestrial gateway (GW) (T-GW) 1100, e.g., an Internet of Things (IoT) terrestrial gateway, in accordance with an exemplary embodiment. Exemplary terrestrial gateway 1100 is, e.g., one of the terrestrial GWs (terrestrial GW 1.206, terrestrial GW 2 208, terrestrial GW 3 210, . . . , terrestrial GW M1 254) of system 600 of FIG. 6.

Terrestrial GW 1100 includes a processor 1102, e.g., a CPU, a wireless interface 1104, e.g., an IoT wireless interface, a network interface 1106, e.g., a wired or optical interface, an assembly of hardware components 1108, e.g., an assembly of circuits, an I/O interface 1110, memory 1112, and, in some embodiments, a SIM card 1109 coupled together via a bus 1114 over which the various elements may interchange data and information. Terrestrial GW 1100 further includes one or more or all of: a speaker 1138, switches 1140, mouse 1142, keyboard/keypad 1144, and display 1146 via which the various I/O devices (1138, 1140, 1142, 1144, 1146) are coupled to the bus 1110 and other elements on the bus.

Wireless interface 1104 includes a wireless receiver (RX) 1126 and a wireless transmitter (TX) 1128. Terrestrial gateway 1100 communicates with other network node, e.g., network server 212, and/or the Internet via network interface 1106. Wireless receiver 1126 is coupled to one or more receive antennas (1130, . . . , 1132), via which the terrestrial GW 1100 receives wireless signals, e.g., IoT wireless signals, from EP devices. Wireless transmitter 1128 is coupled to one or more transmit antennas (1134, . . . , 1136), via which the terrestrial GW 1100 transmits wireless signals, e.g., IoT wireless signals, to EP devices. Exemplary received wireless signals include uplink signals including packets, e.g., packets conveying control data, sensor data, and/or application data. Exemplary transmitted wireless signals include ACKs and DL control and traffic signals, e.g. sourced from the network server and/or an application server. In some embodiments, the same antenna or antennas are use for transmit and receive.

Figure 12:
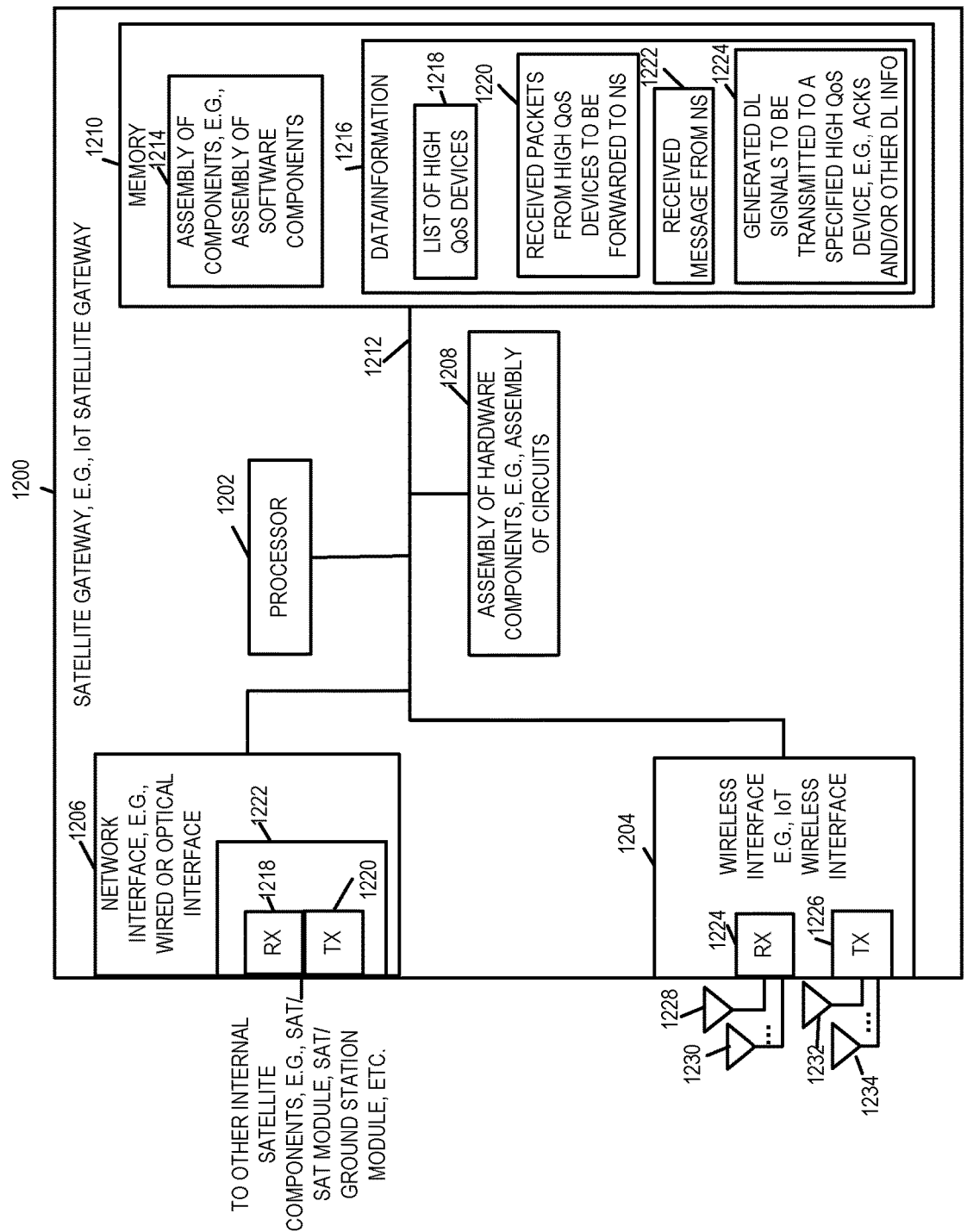
FIG. 12 is a drawing of an exemplary satellite gateway, e.g., an IoT satellite gateway, in accordance with an exemplary embodiment.

FIG. 12 is a drawing of an exemplary satellite gateway (GW) (S-GW) 1200, e.g., an Internet of Things (IoT) satellite gateway, in accordance with an exemplary embodiment. Exemplary satellite gateway 1200 is, e.g., one of the satellite GWs (satellite GW 1 652, . . . , satellite GW M2 658) of system 600 of FIG. 6.

Satellite GW 1200 includes a processor 1202, e.g., a CPU, a wireless interface 1204, e.g., an IoT wireless interface, a network interface 1206, e.g., a wired or optical interface, an assembly of hardware components 1208, e.g., an assembly of circuits, and memory 1210 coupled together via a bus 1212 over which the various elements may interchange data and information.

Wireless interface 1204 includes a wireless receiver (RX) 1224 and a wireless transmitter (TX) 1226. Wireless receiver 1224 is coupled to one or more receive antennas (1230, . . . , 1232), via which the satellite GW 1200 receives wireless signals, e.g., IoT wireless signals, from EP devices. Wireless transmitter 1226 is coupled to one or more transmit antennas (1232, . . . , 1234), via which the satellite GW 1200 transmits wireless signals, e.g., IoT wireless signals, to EP devices. In some embodiments, the same antenna or antennas are use for transmit and receive.

Network interface 1206 includes a receiver (RX) 1218 and a transmitter (TX) 1220. In some embodiments receiver 1218 and transmitter 1220 are included as part of a transceiver 1222. Network interface 1206 couples the satellite GW 1200 to other internal satellite components, e.g., a satellite/satellite module, a ground station module, etc.

Memory 1210 includes an assembly of components 1214, e.g., an assembly of software components, and data/information 1216. Data/information 1216 includes a list of high QoS devices 1218, received packets from high QoS devices to be forwarded to the network server (NS) 1220, received messages from the network server 1222, and generated downlink (DL) signals to be transmitted to a specified high QoS device, e.g., ACKs and/or other DL information. In various embodiments, the satellite gateway forwards received packets from high QoS EP devices but does not forward received packets from non-high QoS devices. In various embodiments, the satellite gateway can, and sometimes does, provide a wireless downlink for a high QoS device, e.g., when a reliable downlink is not available via terrestrial gateways, e.g., under the control of the network server.

Figure 13:
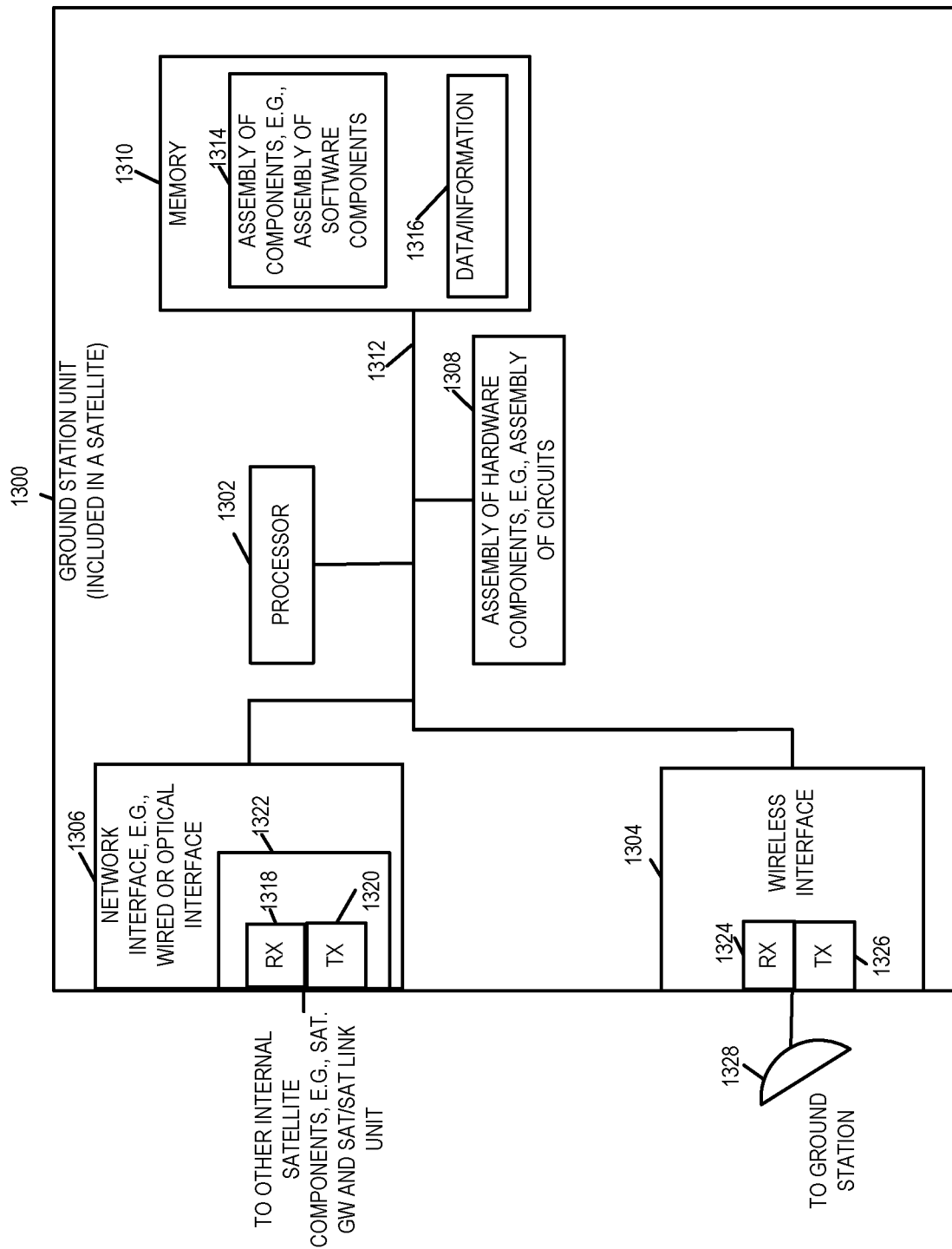
FIG. 13 is a drawing of an exemplary ground station unit included in a satellite in accordance with an exemplary embodiment.

FIG. 13 is a drawing of an exemplary ground station unit 1300 included in a satellite, in accordance with an exemplary embodiment. Exemplary ground station unit 1300 is, e.g., one of the ground station units (ground station unit 655 of satellite 1 215, . . . , ground station unit 660 of satellite M3 217) of system 600 of FIG. 6.

Ground station unit 1300 includes a processor 1302, e.g., a CPU, a wireless interface 1304, a network interface 1306, e.g., a wired or optical interface, an assembly of hardware components 1308, e.g., an assembly of circuits, and memory 1310 coupled together via a bus 1312 over which the various elements may interchange data and information.

Wireless interface 1304 includes a wireless receiver (RX) 1324 and a wireless transmitter (TX) 1326. Wireless receiver 1324 and wireless transmitter 1326 are coupled to antenna 1328 via which the ground station unit 1300 of a satellite receives and sends wireless signals from/to a ground station, e.g., ground station 231 or ground station M2 233 of system 600 of FIG. 6.

Network interface 1306 includes a receiver (RX) 1318 and a transmitter (TX) 1320. In some embodiments receiver 1318 and transmitter 1320 are included as part of a transceiver 1322. Network interface 1306 couples the ground station unit 1300 to other internal satellite components, e.g., a satellite GW, satellite/satellite module, etc.

Memory 1310 includes an assembly of components 1314, e.g., an assembly of software components, and data/information 1316.

Figure 14:
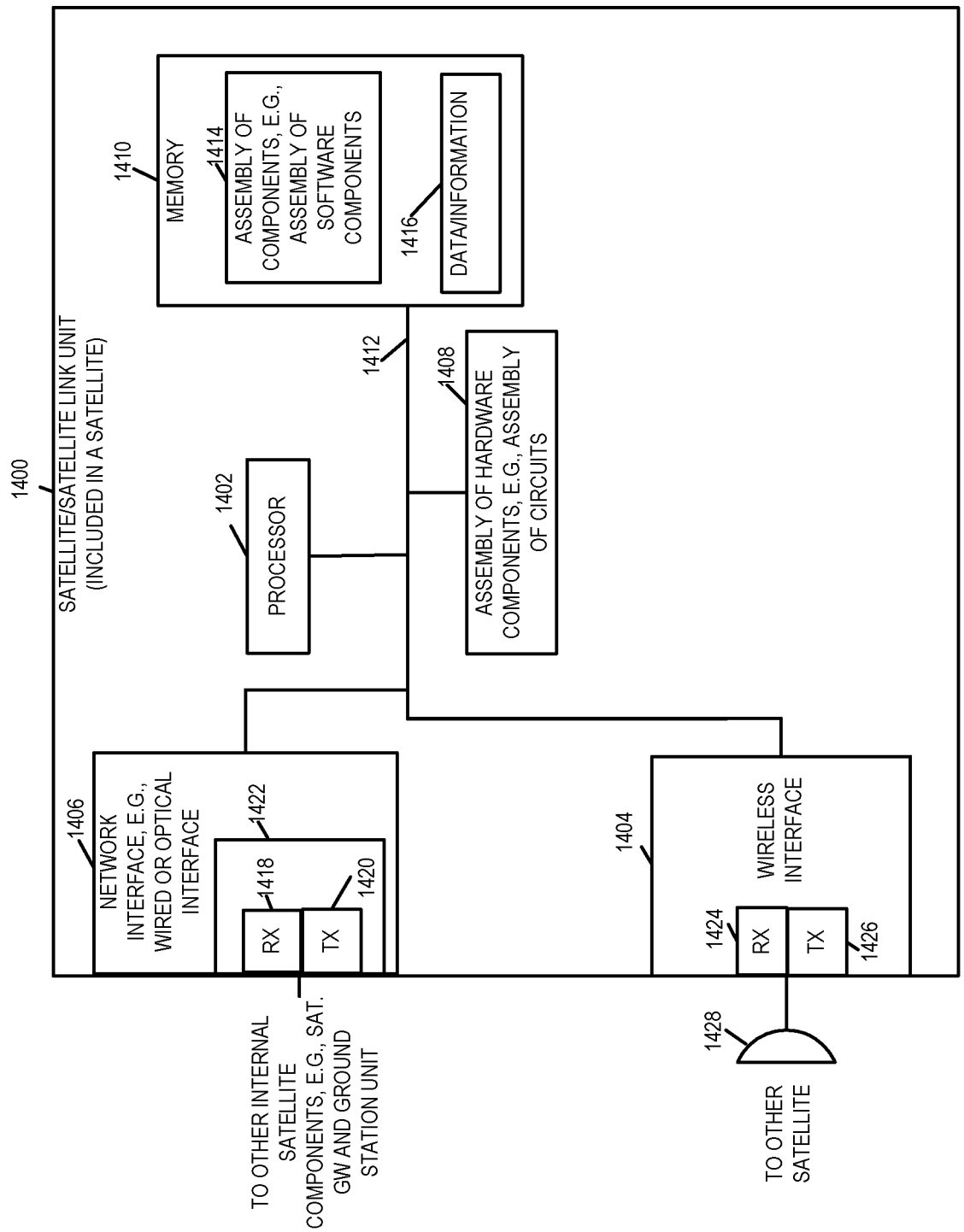
FIG. 14 is a drawing of an exemplary satellite/satellite link unit included in a satellite in accordance with an exemplary embodiment.

FIG. 14 is a drawing of an exemplary satellite/satellite link unit 1400 included in a satellite, in accordance with an exemplary embodiment. Exemplary satellite/satellite unit 1400 is, e.g., one of the satellite/satellite units (satellite/ satellite link unit 656 of satellite 1 215, . . . , satellite/satellite link unit 662 of satellite M3 217) of system 600 of FIG. 6.

Satellite/satellite link unit 1400 includes a processor 1402, e.g., a CPU, a wireless interface 1404, a network interface 1406, e.g., a wired or optical interface, an assembly of hardware components 1408, e.g., an assembly of circuits, and memory 1410 coupled together via a bus 1412 over which the various elements may interchange data and information.

Wireless interface 1404 includes a wireless receiver (RX) 1424 and a wireless transmitter (TX) 1426. Wireless receiver 1424 and wireless transmitter 1426 are coupled to antenna 1428 via which the satellite/satellite link unit 1400 of a satellite receives and sends wireless signals from/to another satellite.

Network interface 1406 includes a receiver (RX) 1418 and a transmitter (TX) 1420. In some embodiments receiver 1418 and transmitter 1420 are included as part of a transceiver 1422. Network interface 1406 couples the satellite/satellite link unit 1400 to other internal satellite components, e.g., a satellite GW, ground station unit, etc.

Memory 1410 includes an assembly of components 1414, e.g., an assembly of software components, and data/information 1416.

Figure 15:
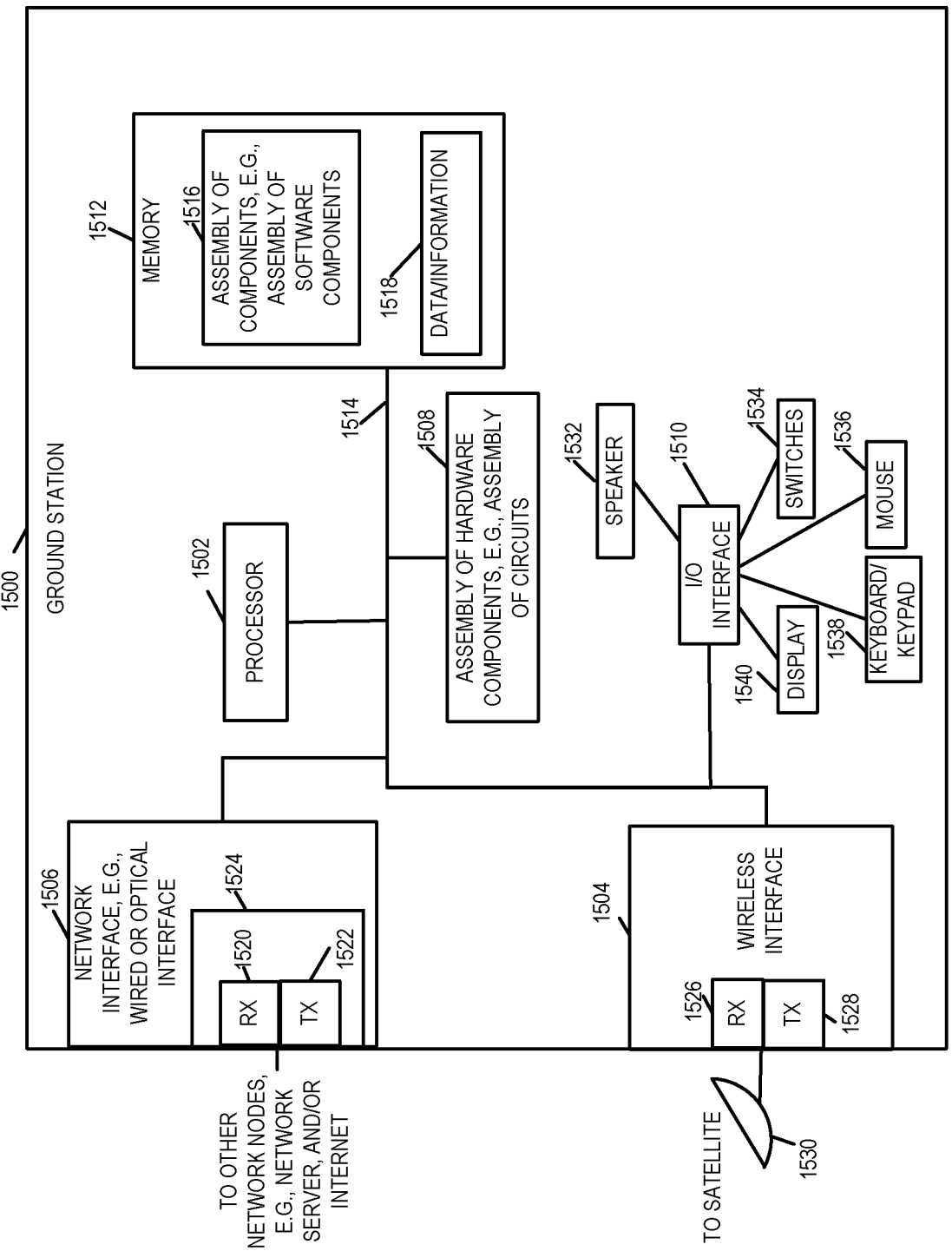
FIG. 15 is a drawing of an exemplary ground station in accordance with an exemplary embodiment.

FIG. 15 is a drawing of an exemplary ground station 1500, in accordance with an exemplary embodiment. Exemplary ground station 1500 is, e.g., one of the ground stations (ground station 1 231, . . . , ground station M2 233) of system 600 of FIG. 6.

Ground station 1500 includes a processor 1502, e.g., a CPU, a wireless interface 1504, a network interface 1506, e.g., a wired or optical interface, an assembly of hardware components 1508, e.g., an assembly of circuits, an I/O interface 1510 and memory 1512 coupled together via a bus 1514 over which the various elements may interchange data and information.

Ground station 1500 further includes a plurality of I/O devices (speaker 1532, switches 1534, mouse 1536, keyboard/keypad 1538, display 1540) coupled to I/O interface 1510, via which the various I/O devices may interchange data and information with other elements coupled to bus 1514.

Wireless interface 1504 includes a wireless receiver (RX) 1526 and a wireless transmitter (TX) 1528. Wireless receiver 1526 and wireless transmitter 1528 are coupled to antenna 1538 via which the ground station 1500 receives and sends wireless signals from/to a satellite, e.g. satellite 215 or satellite 217.

Network interface 1506 includes a receiver (RX) 1520 and a transmitter (TX) 1522. In some embodiments receiver 1520 and transmitter 1522 are included as part of a transceiver 1524. Network interface 1506 couples the ground station 1500 to other network nodes, e.g., a network server, and/or the Internet.

Memory 1510 includes an assembly of components 1514, e.g., an assembly of software components, and data/information 1516.

Figure 16A:
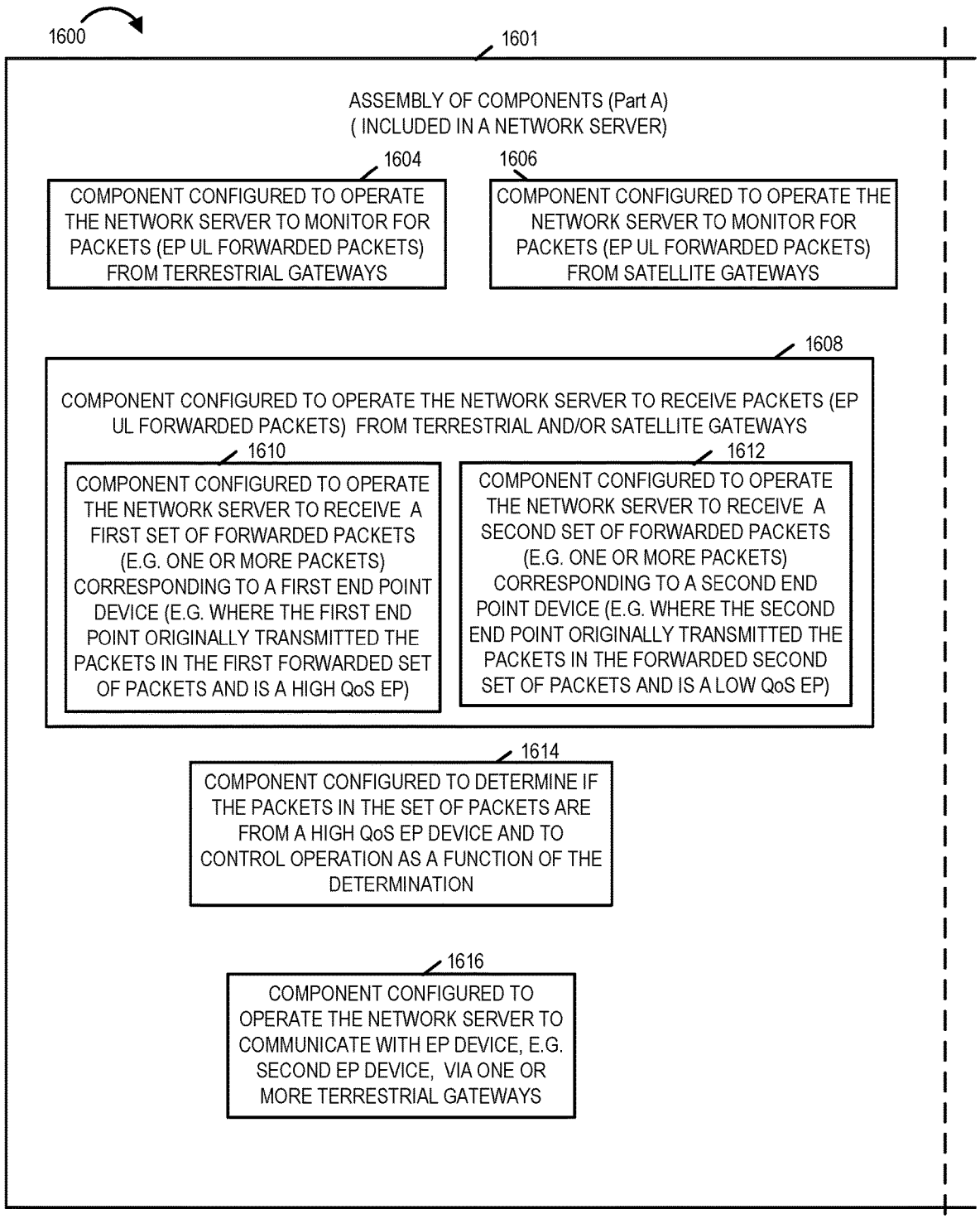
FIG. 16A is a first part of an exemplary assembly of components which may be included in an exemplary network server (NS) in accordance with an exemplary embodiment.
Figures 16, 16B:
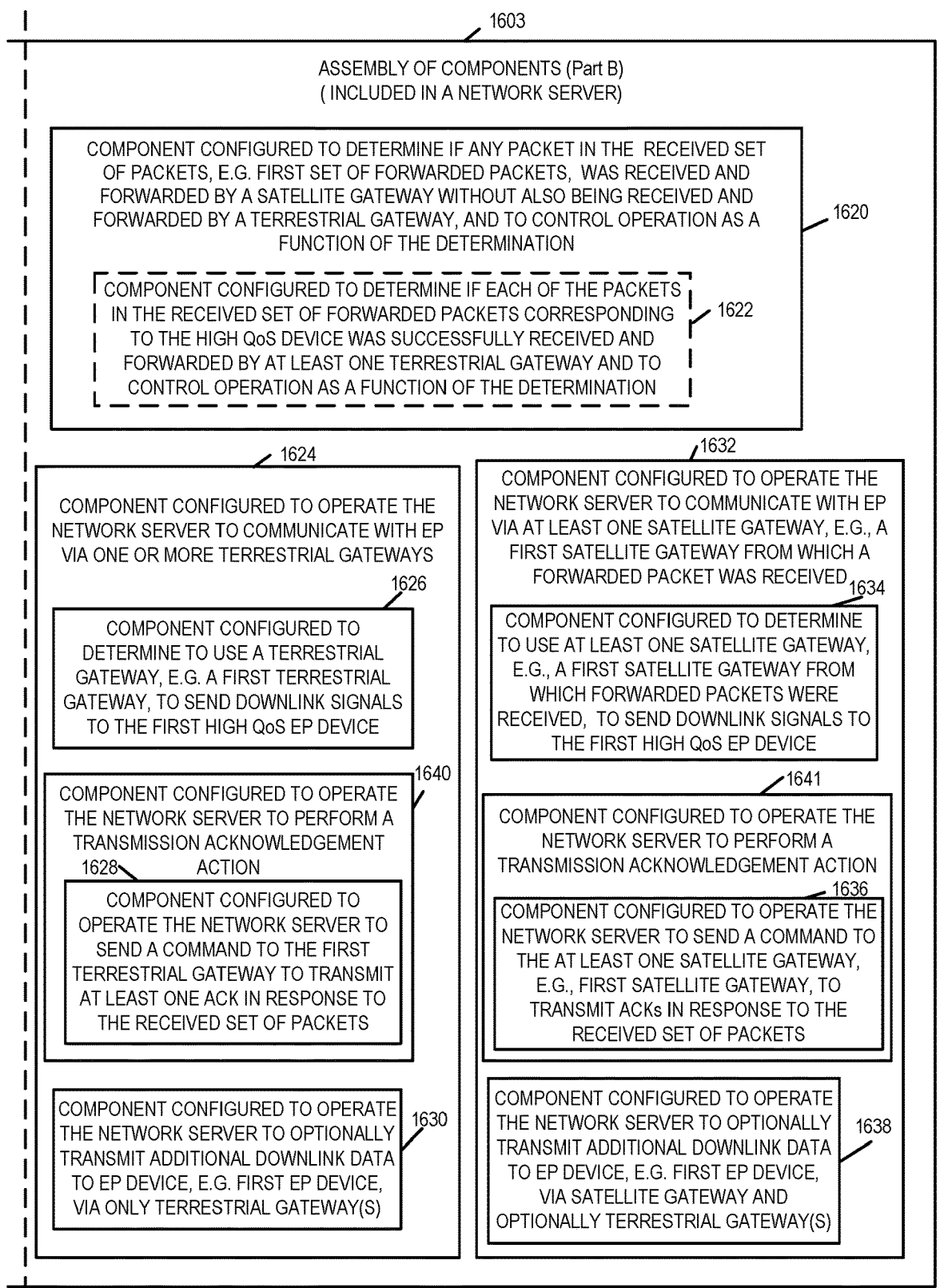
FIG. 16B is a second part of an exemplary assembly of components which may be included in an exemplary network server (NS) in accordance with an exemplary embodiment.
FIG. 16 comprises the combination of FIG. 16A and FIG. 16B.

FIG. 16, comprising the combination of FIG. 16A and FIG. 16B, is a drawing of an exemplary assembly of components 1600, comprising the combination of Part A 1601 and Part B 1603, which may be included in an exemplary network server (NS) in accordance with an exemplary embodiment. The network server (NS) including assembly of components 1600 is, e.g., network server 212 of FIG. 2 and FIG. 6, network server 900 of FIG. 9 and/or a network server implementing steps of flowchart 700 of FIG. 7.

The components in the assembly of components 1600 can, and in some embodiments are, implemented fully in hardware within a processor, e.g., processor 902, e.g., as individual circuits. The components in the assembly of components 1600 can, and in some embodiments are, implemented fully in hardware within the assembly of hardware components 908, e.g., as individual circuits corresponding to the different components. In other embodiments some of the components are implemented, e.g., as circuits, within processor 902 with other components being implemented, e.g., as circuits within assembly of components 908, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 910 of the network server 900, with the components controlling operation of network server 900 to implement the functions corresponding to the components when the components are executed by a processor e.g., processor 902. In some such embodiments, the assembly of components 1600 is included in the memory 910 assembly of software components 924. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1600 is stored in the memory 910, the memory 910 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the network server 900 or elements therein such as the processor 902, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method.

Assembly of components 1600 includes a component 1604 configured to operate the network server to monitor for packets (EP UL forwarded packets) from terrestrial gateways, a component 1606 configured to operate the network server to monitor for packets (EP UL forwarded packets) from satellite gateways, and a component 708 configured to operate the network server to receive packets (EP UL forwarded packets) from terrestrial and/or satellite gateways. Component 708 includes a component configured to operate the network gateway to receive a first set of forwarded packets (e.g., one or more packets) corresponding to a first end point (EP) device, e.g., where the first end point device originally transmitted the packets in the first forwarded set of packets and is a high QoS EP device, and a component 712 configured to operate the network server to receive a second set of forwarded packets (e.g., one or more packets) corresponding to a second end point (EP) device (e.g., where the second end point device originally transmitted the packets in the forwarded second set of packets and is a low QoS EP device.

Assembly of components 1600 further includes a component 1614 configured to determine if the packets in a set of packets are from a high QoS device and to control operation as a function of the determination, and a component 1616 configured to operate the network server to communicate with the EP device, e.g., the second EP device, via one or more terrestrial gateways, e.g. in response to a determination that the set of packets are not from a high QoS EP device.

Assembly of components 1600 further includes a component 1620 configured to determine if any packet in the received set of packets, e.g., the first set of received packets, was received and forwarded by a satellite gateway without also being received and forwarded by a terrestrial gateway, and to control operation as a function of the determination, e.g., in response to a determination that set of packets is from a high QoS device. In some embodiments, component 1620 includes a component 1622 configured to determine if each of the packets in the received set of forwarded packets corresponding to the high QoS device was successfully received and forwarded by at least one terrestrial gateway and to control operation as a function of the determination.

Assembly of components 1600 further includes a component 1624 configured to operate the network server to communication with the high QoS EP device via one or more terrestrial gateways, e.g. in response to a determination that each of the packets in the received set of forwarded packets corresponding to the high QoS EP device was successfully received and forwarded by at least one terrestrial gateway. Component 16124 includes a component 1626 configured to determine to use a terrestrial gateway, e.g., a first terrestrial gateway, to send downlink signals to the first high QoS device, and a component 1640 configured to operate the network server to perform a transmission acknowledgement action. Component 1640 includes a component 1628 configured to operate the network server to send a command to the first terrestrial gateway to transmit at least one acknowledgment in response to the received set of packets. Component 1624 further includes a component 1630 configured to operate the network server to optionally transmit additional downlink data to the EP device, e.g., the first EP device, via only terrestrial gateway(s).

Assembly of components 1600 further includes a component 1632 configured to operate the network server to communicate with the high QoS EP device via at least one satellite gateway, e.g., a first satellite gateway from which a forwarded packet was received, e.g., in response to a determination that at least one packet in the received set of packets, e.g., first set of forwarded packets, was received and forwarded by a satellite gateway without also being received and forwarded by a terrestrial gateway. Component 1632 includes a component 1634 configured to determine to use at least one satellite gateway, e.g., a first satellite gateway from which forwarded packets were received, to send downlinks signals to the first high QoS EP device, and a component 1641 configured to operate the network server to perform a transmission acknowledgment action. Component 1641 includes a component 1638 configured to operate the network server to send a command to at least one satellite gateway, e.g. the first satellite gateway, to transmit acknowledgement(s), e.g., at least one acknowledgment, in response to the received set of packets. Component 1632 further includes a component 1638 configured to operate the network server to optionally transmit additional downlink data to the EP device, e.g., first EP device which is a high QoS EP device, via satellite gateway and optionally via terrestrial gateway(s).

Figure 17A:
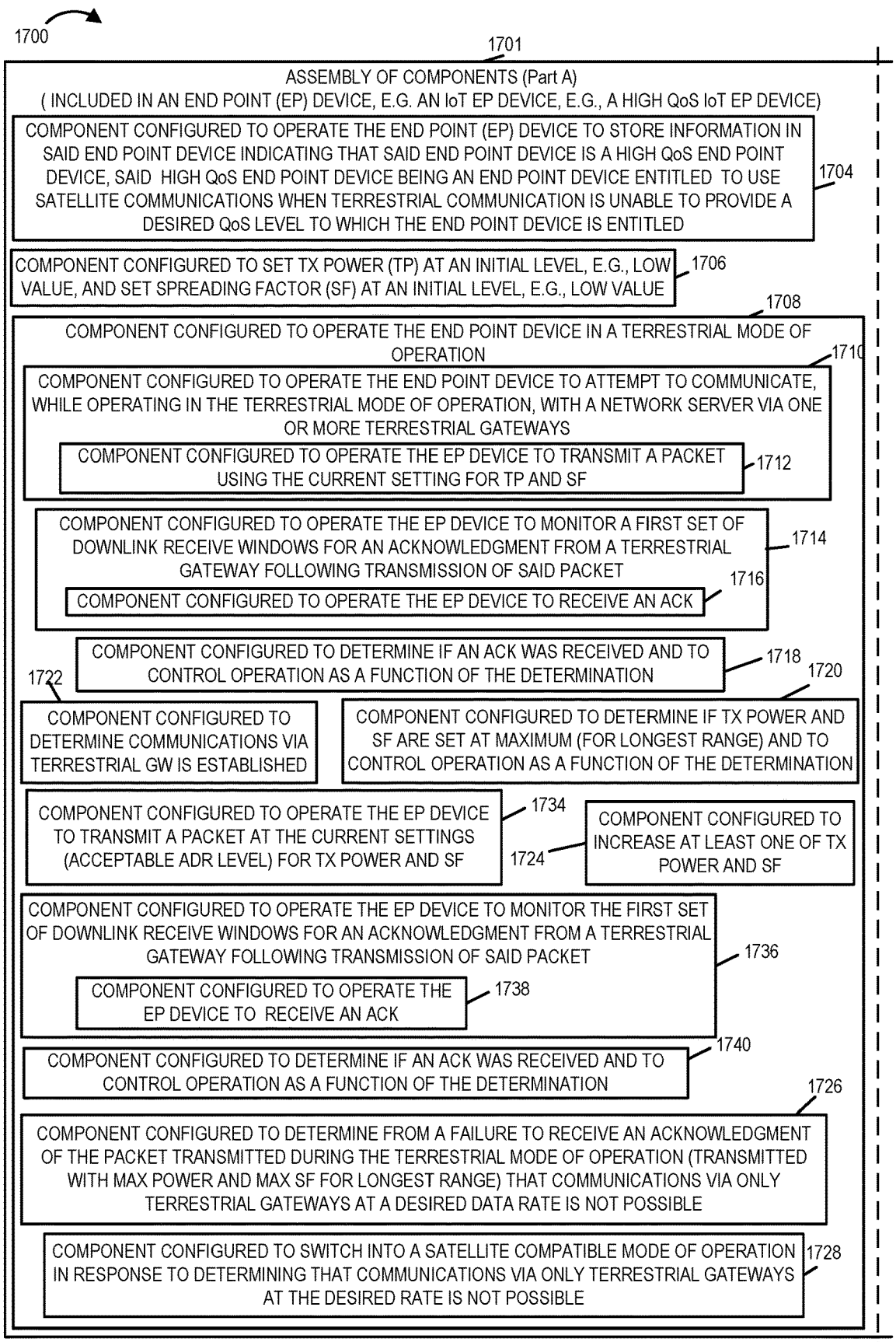
FIG. 17A is a first part of an exemplary assembly of components which may be included in an exemplary end point (EP) device, e.g., a high Quality of Service (QoS) EP device, in accordance with an exemplary embodiment.
Figures 17, 17B:
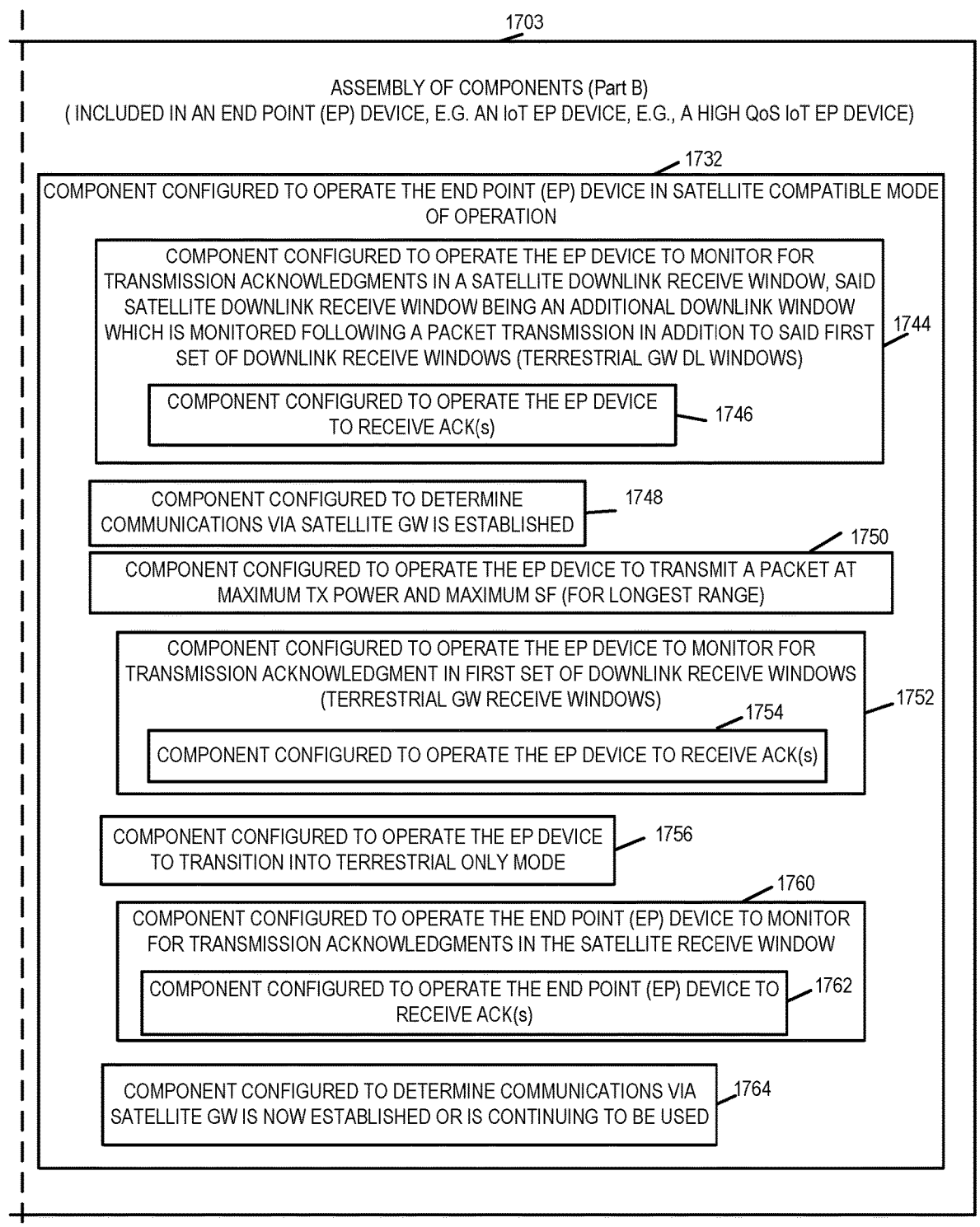
FIG. 17B is a second part of an exemplary assembly of components which may be included in an exemplary end point (EP) device, e.g., a high Quality of Service (QoS) EP device, in accordance with an exemplary embodiment.
FIG. 17 comprises the combination of FIG. 17A and FIG. 17B.

FIG. 17, comprising the combination of FIG. 17A and FIG. 17B, is a drawing of an exemplary assembly of components 1700, comprising the combination of Part A 1701 and Part B 1703, which may be included in an exemplary end point (EP) device, e.g., a high Quality of Service (QoS) EP device, e.g., a high QoS Internet-of-Things (IoT) EP device, in accordance with an exemplary embodiment. The end point (EP) device including assembly of components 1700 is, e.g., end point (EP) device 1000 of FIG. 10, EP device 202 of FIG. 2, any of the high QoS EP devices (202, 203, 205) of FIG. 6, and/or an EP device implementing the method of flowchart 800 of FIG. 8.

The components in the assembly of components 1700 can, and in some embodiments are, implemented fully in hardware within a processor, e.g., processor 1002, e.g., as individual circuits. The components in the assembly of components 1700 can, and in some embodiments are, implemented fully in hardware within the assembly of hardware components 1008, e.g., as individual circuits corresponding to the different components. In other embodiments some of the components are implemented, e.g., as circuits, within processor 1002 with other components being implemented, e.g., as circuits within assembly of components 1008, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1012 of the control EP device 1000, with the components controlling operation of EP device 1000 to implement the functions corresponding to the components when the components are executed by a processor e.g., processor 1002. In some such embodiments, the assembly of components 1700 is included in the memory 1012 as assembly of software components 1066. In still other embodiments, various components in assembly of components 1700 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1700 is stored in the memory 1012, the memory 1012 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the EP device 1000 or elements therein such as the processor 1002, to perform the functions of corresponding steps illustrated and/or described in the method of one or more of the flowcharts, signaling diagrams and/or described with respect to any of the Figures. Thus the assembly of components 1700 includes various components that perform functions of corresponding one or more described and/or illustrated steps of an exemplary method.

Assembly of components 1700 includes a component 1704 configured to operate the end point (EP) device to store information in said EP device indicating that said end point device is a high QoS EP device, said high QoS EP device being an EP device entitled to use satellite communications when terrestrial communications is unable to provide a desired QoS level to which the end point device is entitled, a component 1706 configured to set transmit (TX) power at an initial level, e.g., a low value, and set spreading factor (SF) at an initial level, e.g. a low value, and a component 1708 configured to operate the end point device in a terrestrial mode of operation.

Component 1708 includes a component 1710 configured to operate the end point device to attempt to communicate, while operating in the terrestrial mode of operation, with a network server via one or more terrestrial gateways. Component 1710 includes a component 1712 configured to operate the EP device to transmit a packet using the current setting for transmit power (TP) and spreading factor (SF). Component 1708 further includes a component 1714 configured to operate the EP device to monitor a first set of downlink receive windows for acknowledgment from a terrestrial gateway following transmission of said packet. Component 1714 includes a component 1716 configured to operate the EP device to receive an acknowledgement, e.g., during the first set of downlink receive windows. Component 1708 further includes a component 1718 configured to determine if an acknowledgment was received, e.g., while monitoring the first set of downlink receive windows, and to control operation as a function of the determination, a component 1722 configured to determine communications via terrestrial gateway is established, e.g. in response to a determination that an ACK in response to the transmitted packet was received while monitoring the first set of downlink receive windows.

Component 1708 further includes a component 1724 configured to increase at least one of transmit power and spreading factor, e.g., in response to a determination that an acknowledgment was not received during the monitoring of the first set of downlink windows and the transmit power (TP) and spreading factor (SF) are not set at maximum (e.g., for longest range).

Component 1708 further includes a component 1734 configured to operate the end point device to transmit a packet at the current settings (acceptable ADR level) for TX power and SF, e.g., following a determination that communications via terrestrial gateway is established, and a component 1736 configured to operate the end point device to monitor the first set of downlink receive windows (associated with terrestrial gateways) for an acknowledgment from a terrestrial gateway following transmission of said packet. Component 1736 includes a component 2738 configured to operate the end point device to receive an acknowledgment. Component 1708 further includes a component 1740 configured to determine if an acknowledgment was received, e.g., in the monitoring performed by component 1736, and to control operation as a function of the determination.

Component 1708 further includes a component 1726 configured to determine from a failure to receive an acknowledgment of the packet transmitted during the terrestrial mode of operation (transmitted at maximum power and maximum spreading factor for longest range) that communications via only terrestrial gateways at a desired data rate is not possible, and a component 1728 configured to switch into a satellite compatible mode of operation in response to determining that communications via only terrestrial gateways at the desired rate is not possible.

Assembly of components 1700 further includes a component 1732 configured to operate the end point (EP) device in satellite compatible mode of operation. Component 1732 includes a component 1744 configured to operate the end point device to monitor for transmission acknowledgments in a satellite downlink receive window, said satellite downlink receive window being an additional window which is monitored following a packet transmission in addition to said first set of downlink receive windows (terrestrial gateway (GW) downlink windows). Component 1744 includes a component configured to operate the end point device to receive ack(s), e.g., in the satellite downlink receive window. Component 1732 further includes a component 1748 configured to determine communications via satellite gateway is established, e.g., in response to an ack being received by the monitoring of component 1744, a component 1750 configured to operate the EP device to transmit a packet at maximum transmit power and maximum spreading factor (for longest range), and a component 1752 configured to operate the EP device to monitor for transmission acknowledgment in the first set of downlink receive windows (terrestrial GW receive windows). Component 1752 includes a component 1754 configured to operate the EP device to receive ack(s) during the first set of downlink receive windows, e.g., in response to a packet transmitted under the direction of component 1750, a component 1756 configured to operate the EP device to transition into terrestrial only mode, e.g., in response to an ack being received by the monitoring of component 1752, a component 1760 configured to operate the EP device to monitor for transmission acknowledgments in the satellite receive window 1760, e.g. in response to a determination that an acknowledgment has not been received in the monitoring of step 1752 which monitors terrestrial receive window(s). Component 1760 includes a component 1762 configured to operate the EP device to receive acknowledgement (s) during the satellite receive window.

Component 1732 further includes a component 1764 configured to determine communications via satellite gateway is now established or is continuing to be used, e.g. in response to an acknowledgment being received by component 1762 while monitoring the satellite receive window, said acknowledgment having been transmitted by a satellite gateway, e.g., under the direction of the network server.

Various aspects, features, and/or advantages of some embodiments of the present invention are further described below.

In some embodiments, in accordance with the present invention, a communications protocol, e.g., an Internet of Things (IoT) protocol, such as, e.g., LoRaWAN, is augmented by providing support to satellite communications.

Some IoT/LoRaWAN devices in a communications network will typically not be reachable via terrestrial gateways (GWs). For example some ground level sensor devices, e.g., some smart parking devices and/or some utility (water/gas/electric) meter devices, can be hard to reach from terrestrial GWs. In accordance with the feature of various embodiments of the present invention, the network is augmented with low earth orbit (LEO) and/or medium earth orbit (MEO) satellite gateways which provide more reach and availability for devices struggling to reach the network. The protocol, e.g. the LoRaWAN protocol, is augmented for potential integration with satellite (LEO/MEO) gateways.

In some embodiments, using a protocol, e.g., a LoRaWAN protocol, a device is allowed N retransmissions (8 per the LoRa standard) of any Confirmed Frame to ensure its delivery. The reTx algorithm also makes use of the ADR (adaptive datarate) algorithm to maximize at each reTX the link budget and increase the chances a gateway (GW) can pick-up the message. After the 8 reTX the device will need to abandon the transmission and the frame is lost.

In some embodiments of the present invention, the reTX algorithms are augmented to include an option of a satellite relaying the frame from and to an EP device, e.g., a LoRaWAN EP device. An advantageous feature of some embodiments, is being able to ensure higher QoS for each device, e.g., each device which subscribes to a highest level of offered QoS service, and minimize frame loss across frames.

In some embodiments, a service provide, implementing an embodiment of the current invention, offers a high QoS for customers that need to ensure no frame loss of sensitive information, e.g., fire/police, customers in utility, customers in critical infrastructure monitoring, etc., ensuring that all the frames sent by the devices and sensors will be recovered by the customer backend application.

Incorporation of features and/or aspects of the present invention to a network adds robustness and resilience to the network. Thus a service provider network, e.g. an Internet-of-Things (IoT) service provider network, implemented in accordance with the present invention, has significant advantages over a competitor's network.

In some embodiments, an adaptive datarate (ADR) and re-transmission (re-TX) algorithm using terrestrial gateways is augmented by adding satellite gateways for a certain class of devices (class of EP devices). In some embodiments, for devices (EP devices) that will require and subscribe to a highest level of QoS (e.g., subscribers of a 0 packet lost service over satellite GWs), in the last re-TX attempt, such devices (such EP devices) will implement an addition receive window (e.g., a third receive window—associated with satellite GWs), in addition to one or more windows (e.g., 2 windows—associated with terrestrial GWs). In some such embodiments, in the case that none of the uplinks from the EP device reach the network server (NS) via the terrestrial GWs and given the each of the ULs are already forwarded to the NS (thru the satellite GW) and that the NS is aware of the EP struggle to reach the network, the NS will queue the DL/ACK to the device on its addition (3rd) RX window. In some embodiments, the additional, e.g., 3rd window associated with satellite GWs, can be, and sometimes is, adjusted and negotiated between the NS and the EP devices, e.g., as part of device onboarding/commissioning.

In some embodiments, a constellation of 3-4 satellite GWs is able to cover the North American (NA) region, e.g., providing this high level of QoS service to subscriber IoT devices.

The following first set of Method Embodiments is directed to a method of operating an end point (EP) device and is supported by FIG. 8, FIG. 9 and other Figures.

First Numbered Set of Exemplary Method Embodiments

Method Embodiment 1 A communications method implemented by an end point (EP) device (202 or 1000), the method comprising: operating the EP device to attempt (810) to communicate, while operating in a terrestrial mode of operation, with a network server via one or more terrestrial gateways, said attempt to communicate including transmitting (812) a packet (where the packet can be a single transmitted packet or a packet within a set of packets, e.g., a frame of packets); monitoring (814) a first set of downlink receive windows for an acknowledgment from a terrestrial gateway following the transmission of said packet (the acknowledgment may be an expected acknowledgement that is to be transmitted upon successful receipt of said packet or a set of packets including said packet); determining (826), from a failure to receive an acknowledgement of the packet transmitted during said terrestrial mode of operation (e.g., transmitted with maximum power and maximum SF for longest range) that communications via only terrestrial gateways at a desired data rate (e.g., lowest data rate for maximum range) is not possible; and in response to determining (826) that communications via only terrestrial gateways at a desired data rate is not possible switching (828) into a satellite compatible mode of operation.

Method Embodiment 2 The method of Method Embodiment 1, further comprising: operating (832) the end point device in satellite compatible mode of operation, wherein operating (832) in said satellite compatible mode of operation includes: monitoring (844 and/or 860) for transmission acknowledgements in a satellite downlink receive window (510), said satellite downlink receive window (510) being an additional downlink which is monitored following a packet transmission in addition to said first set of downlink receive windows (506, 508).

Method Embodiment 3 The communications method of Method Embodiment 1, wherein said satellite downlink receive window is not monitored for acknowledgements during said terrestrial mode of operation.

Method Embodiment 4 The communications method of Method Embodiment 2, further comprising: prior to determining (826), from a failure to receive an acknowledgement that communications via only terrestrial gateways at a desired data rate is not possible, performing (one iteration of 824 before exiting step 820 to step 826) at least one (but possible both) of i) increasing transmit power to a maximum EP transmit power level or ii) increasing a spreading factor (SF) to a maximum spreading factor.

Method Embodiment 5 The communications method of Method Embodiment 4, wherein said operating an EP device to attempt (810) to communicate with a network server via one or more terrestrial gateways includes transmitting (one or more iterations of step 812) said packet from the EP device using the maximum EP transmit power level.

Method Embodiment 6 The communications method of Method Embodiment 2, wherein during said satellite compatible mode of operation the EP device monitors more downlink receive windows for acknowledgements following a packet transmission than during a terrestrial mode of operation which is used prior to switching into the satellite compatible mode of operation.

Method Embodiment 7 The communications method of Method Embodiment 4, wherein said packet is transmitted with a request for an acknowledgement.

Method Embodiment 8 The communications method of Method Embodiment 7, further comprising: storing (804) information in said end point device indicating that said end point device is a high QoS end point device, said high QoS end point device being an end point device entitled to use satellite communication when terrestrial communication is unable to provide a desired QoS level to which the end point device is entitled.

Method Embodiment 9 The communications method of Method Embodiment 1, wherein the EP device is an Internet-of-Things (IoT) EP device.

Method Embodiment 10 The communications method of Method Embodiment 1, wherein said transmitted packet is transmitted as part of broadcast signals intended to be received by one or more gateways (e.g., any of T-GW 1 206, T-GW 2 208, T-GW 3 210, . . . , T-GW M1 254, Sat. GW 1 652, . . . , Sat. GW M3 658)

The following second set of numbered exemplary method embodiments are written from the network server perspective and are supported by FIGS. 7A, 7B and other figures which related to an implementation where the network server responds, at least in some cases, if packets are forwarded to it. The check whether a full set, e.g., all packets, are received from terrestrial gateways and the check whether none of the packets were received from a satellite gateway without being received from a terrestrial gateway can be though of as different ways of saying the same thing since the process flow in some embodiments, assumes some packet was received and forwarded. Non-High QoS EPs are not entitled to use satellites and thus do not get pushed into the loop relating to forwarding of packets from satellite gateways and are limited to terrestrial gateway use in some implementations.

Second Numbered Set of Exemplary Method Embodiments

Method Embodiment 1 A communications method, the method comprising: receiving (710), at a network server (212 or 900), a first set of forwarded packets (e.g., packets corresponding to a frame with individual packets having packet ids allowing duplicate copies of the packets to be identified), said forwarded packets originating from a first end point device (202 or 203) and being forwarded by one or more gateways (e.g., packets forwarded from satellite gateways and/or terrestrial gateways); and determining (720), at the network server, if any packet in the first set of packets was received and forwarded by a satellite gateway without also being received and forwarded by a terrestrial gateway; and taking a transmission acknowledgement action (740) based on said determining.

Method Embodiment 2 The method of Method Embodiment 1, wherein when it is determined that a packet in the first set of packets was received and forwarded by a satellite gateway without also being received and forwarded by a terrestrial gateway said transmission acknowledgement action (740) includes: sending (736) a command to a first satellite gateway which forwarded at least one of the received packets to transmit acknowledgement signals to the first end point device.

Method Embodiment 3 The method of Method Embodiment 2, wherein when it is determined that no packet in the first set of packets was received and forwarded by a satellite gateway without also being received and forwarded by a terrestrial gateway, said transmission acknowledgement action (740) includes: controlling (728) a terrestrial gateway to send an acknowledgement to said first end point device.

Method Embodiment 4 The method of Method Embodiment 3, wherein said first end point (EP) device is an Internet-of-Things (IoT) EP device.

Method Embodiment 5 The method of Method Embodiment 4, wherein said terrestrial gateway and said satellite gateway are IoT gateways.

Method Embodiment 6 The method of Method Embodiment 3, wherein said network server communicates with a satellite gateway via a satellite ground station.

Method Embodiment 7 The method of Method Embodiment 6, wherein said first end point device communicates directly with the satellite gateway via wireless signals.

Method Embodiment 8 The method of Method Embodiment 1, wherein said satellite gateway forwards received packets from high QoS end point devices but does not forward received packets from low QoS end point devices.

Method Embodiment 9 The method of method embodiment 3, further comprising: receiving (712), at a network server (212 or 900), a second set of forwarded packets (e.g., packets corresponding to a frame with individual packets having packet ids allowing duplicate copies of the packets to be identified), said forwarded packets originating from a second end point device (207) and being forwarded by one or more gateways (e.g., packets forwarded from terrestrial gateway(s) (e.g., T-GW 207)); determining (714), at the network server, that the second end point device (207) is not a high QoS EP device (e.g., second EP device is a low QoS device); and in response to determining that the second end point device (207) is not a high QoS EP device, communicating with the second EP device (207) via one or more terrestrial gateways (210).

First Set of Exemplary Numbered Apparatus Embodiments

Apparatus Embodiment 1 An end point (EP) device (202 or 1000), comprising: a processor (1002) configured to: operate the EP device to attempt (810) to communicate, while operating in a terrestrial mode of operation, with a network server (212 or 900) via one or more terrestrial gateways (206, 208, 210, 254), said attempt to communicate including transmitting (812) a packet (where the packet can be a single transmitted packet or a packet within a set of packets, e.g., a frame of packets); operate the EP device to monitor (814) a first set of downlink receive windows for an acknowledgment from a terrestrial gateway following the transmission of said packet (the acknowledgment may be an expected acknowledgement that is to be transmitted upon successful receipt of said packet or a set of packets including said packet); determine (826), from a failure to receive an acknowledgement of the packet transmitted during said terrestrial mode of operation (e.g., transmitted with maximum power and maximum SF for longest range) that communications via only terrestrial gateways at a desired data rate (e.g., lowest data rate for maximum range) is not possible; and in response to determining (826) that communications via only terrestrial gateways at a desired data rate is not possible switch (828) into a satellite compatible mode of operation.

Apparatus Embodiment 2 The end point device (202 or 1000) of Apparatus Embodiment 1, wherein said processor (1002) is further configured to: operate (832) the end point device in satellite compatible mode of operation, wherein operating (832) in said satellite compatible mode of operation includes: operating the end point device to monitor (844 and/or 860) for transmission acknowledgements in a satellite downlink receive window (510), said satellite downlink receive window (510) being an additional downlink which is monitored following a packet transmission in addition to said first set of downlink receive windows (506, 508).

Apparatus Embodiment 3 The end point device (202 or 1000) of Apparatus Embodiment 1, wherein said satellite downlink receive window is not monitored for acknowledgements during said terrestrial mode of operation.

Apparatus Embodiment 4 The end point device (202 or 1000) of Apparatus Embodiment 2, wherein said processor (1002) is further configured to: prior to determining (826), from a failure to receive an acknowledgement that communications via only terrestrial gateways at a desired data rate is not possible, operate the end point device to perform (one iteration of 824 before exiting step 820 to step 826) at least one (but possible both) of i) increasing transmit power to a maximum EP transmit power level or ii) increasing a spreading factor (SF) to a maximum spreading factor.

Apparatus Embodiment 5 The end point device (202 or 1000) of Apparatus Embodiment 4, wherein said processor (1002) is configured to: operate the EP device to transmit (one or more iterations of step 812) said packet from the EP device using the maximum EP transmit power level, as part of being configured to operate an EP device to attempt (810) to communicate with a network server via one or more terrestrial gateways.

Apparatus Embodiment 6 The end point device (202 or 1000) of Apparatus Embodiment 2, wherein during said satellite compatible mode of operation the EP device monitors more downlink receive windows for acknowledgements following a packet transmission than during a terrestrial mode of operation which is used prior to switching into the satellite compatible mode of operation.

Apparatus Embodiment 7 The end point device (202 or 1000) of Apparatus Embodiment 4, wherein said processor (1002) is configured to transmit said packet transmitted with a request for an acknowledgement.

Apparatus Embodiment 8 The end point device (202 or 1000) of Apparatus Embodiment 7, wherein said processor (1002) is further configured to: operate the EP device to store (804) information in said end point device (e.g., in EP device memory (1012) indicating that said end point device is a high QoS end point device, said high QoS end point device being an end point device entitled to use satellite communication when terrestrial communication is unable to provide a desired QoS level to which the end point device is entitled.

Apparatus Embodiment 9 The end point device (202 or 1000) of Apparatus Embodiment 1, wherein the EP device is an Internet-of-Things (IoT) EP device.

Apparatus Embodiment 10 The end point device (202 or 1000) of Apparatus Embodiment 1, wherein said transmitted packet is transmitted as part of broadcast signals intended to be received by one or more gateways.

The following Second Set of Apparatus Embodiments are directed to the network server perspective and are supported by FIGS. 7A and 7B and other Figures which cover the idea that the network server responds, at least in some cases, if packets are forwarded to it. The check whether a full set of packets, e.g., all packets in a set of packets transmitted by a device, are received from terrestrial gateways and the check whether none of the packets were received from a satellite gateway without being received from a terrestrial gateway are different ways of covering the same requirement since the flow assumes some packet was received and forwarded. Non-High QoS EPs are not entitled, in some embodiments, to use satellites and thus do not get pushed into the loop relating to forwarding of packets from satellite gateways and are limited to terrestrial gateway use in such embodiments.

Second Set of Exemplary Numbered Apparatus Embodiments:

Apparatus Embodiment 1 A network server (212 or 900) comprising: a processor (902) configured to: operate the network server to receive (710), at the network server (e.g., via a receiver (916)), a first set of forwarded packets (e.g., packets corresponding to a frame with individual packets having packet ids allowing duplicate copies of the packets to be identified), said forwarded packets originating from a first end point device and being forwarded by one or more gateways (e.g., packets forwarded from satellite gateways and/or terrestrial gateways); and determine (720), at the network server, if any packet in the first set of packets was received and forwarded by a satellite gateway without also being received and forwarded by a terrestrial gateway; and operate the network server to take a transmission acknowledgement action (740) based on said determining.

Apparatus Embodiment 2 The network server (212 or 900) of Apparatus Embodiment 1, wherein said processor (902) is configured to: operate the network server to send (736) a command to a first satellite gateway (652) which forwarded at least one of the received packets to transmit acknowledgement signals to the first end point device, as part of being configured to take a transmission acknowledgement action (740), when the network server determines that a packet in the first set of packets was received and forwarded by a satellite gateway without also being received and forwarded by a terrestrial gateway.

Apparatus Embodiment 3 The network server (212 or 900) of Apparatus Embodiment 2, wherein said processor (902) is configured to: control (728) a terrestrial gateway to send an acknowledgement to said first end point device, as part of being configured to take a transmission acknowledgement action (740), when it is determined that no packet in the first set of packets was received and forwarded by a satellite gateway without also being received and forwarded by a terrestrial gateway.

Apparatus Embodiment 4 The network server (212 or 900) of Apparatus Embodiment 3, wherein said first end point (EP) device (202) is an Internet-of-Things (IoT) EP device.

Apparatus Embodiment 5 The network server (212 or 900) of Apparatus Embodiment 4, wherein said terrestrial gateway (206) and said satellite gateway (652) are IoT gateways.

Apparatus Embodiment 6 The network server (212 or 900) of Apparatus Embodiment 3, wherein said network server (212 or 900) communicates with a satellite gateway (652) via a satellite ground station (231).

Apparatus Embodiment 7 The network server (212 or 900) of Apparatus Embodiment 6, wherein said first end point device (202 or 1000) communicates directly with the satellite gateway (652) via wireless signals.

Apparatus Embodiment 8 The network server (212 or 900) of Apparatus Embodiment 1, wherein said satellite gateway (652) forwards received packets from high QoS end point devices (202, 203, 205) but does not forward received packets from low QoS end point devices (207, 209, 211).

Apparatus Embodiment 9 The network server (212 or 900) of Apparatus embodiment 3, wherein said processor (902) is further configured to: operate the network server to receive (712), at a network server (212 or 900) (e.g., via receiver 916), a second set of forwarded packets (e.g., packets corresponding to a frame with individual packets having packet ids allowing duplicate copies of the packets to be identified), said forwarded packets originating from a second end point device (207) and being forwarded by one or more gateways (e.g., packets forwarded from terrestrial gateway(s)) (e.g., T-GW 210); determine (714), at the network server, that the second end point device (207) is not a high QoS EP device (e.g., second EP device is a low QoS device); and in response to determining that the second end point device (207) is not a high QoS EP device, communicating with the second EP device (207) via one or more terrestrial gateways (210).

Numbered List of Exemplary Non-Transitory
Computer Readable Medium Embodiments

Non-Transitory Computer Readable Medium Embodiment 1 A non-transitory computer readable medium (1012) including computer executable instructions which when executed by a processor (1002) of an end point (EP) device (1000) cause the end point (EP) device (1000) to perform the steps of: operating the EP device (1000) to attempt (810) to communicate, while operating in a terrestrial mode of operation, with a network server via one or more terrestrial gateways, said attempt to communicate including transmitting (812) a packet (where the packet can be a single transmitted packet or a packet within a set of packets, e.g., a frame of packets); monitoring (814) a first set of downlink receive windows for an acknowledgment from a terrestrial gateway following the transmission of said packet (the acknowledgment may be an expected acknowledgement that is to be transmitted upon successful receipt of said packet or a set of packets including said packet); determining (826), from a failure to receive an acknowledgement of the packet transmitted during said terrestrial mode of operation (e.g., transmitted with maximum power and maximum SF for longest range) that communications via only terrestrial gateways at a desired data rate (e.g., lowest data rate for maximum range) is not possible; and in response to determining (826) that communications via only terrestrial gateways at a desired data rate is not possible switching (828) into a satellite compatible mode of operation.

Non-Transitory Computer Readable Medium Embodiment 2 A non-transitory computer readable medium (910) including computer executable instructions which when executed by a processor (902) of a network server (900) cause the network server (900) to perform the steps of: receiving (710), at a network server, a first set of forwarded packets (e.g., packets corresponding to a frame with individual packets having packet ids allowing duplicate copies of the packets to be identified), said forwarded packets originating from a first end point device and being forwarded by one or more gateways (e.g., packets forwarded from satellite gateways and/or terrestrial gateways); and determining (720), at the network server, if any packet in the first set of packets was received and forwarded by a satellite gateway without also being received and forwarded by a terrestrial gateway; and taking a transmission acknowledgement action (740) based on said determining.

Various embodiments are directed to apparatus, e.g., control servers such as application servers (ASs), network servers, gateways such as IoT gateways, terrestrial gateways, e.g. terrestrial IoT GWs, satellite gateways, e.g. IoT satellite GWs, End Point (EP) devices such as EP IoT devices, e.g. EP IoT sensor or application devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, an AMF device, servers, customer premises equipment devices, satellites, satellite components, satellite units, satellite ground stations, cable systems, non-cellular networks, cellular networks, service management systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating control servers such as application servers (ASs), network server, gateways such as IoT gateways, terrestrial gateways, e.g. terrestrial IoT GWs, satellite gateways, e.g., IoT satellite GWs, End Point (EP) devices such as EP IoT devices, e.g. EP IoT sensor or application devices user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, user devices, base stations, gateways, servers, cable networks, cloud networks, nodes, servers, cloud service servers, customer premises equipment devices, satellites, satellite components, satellite units, satellite ground stations, controllers, network monitoring nodes/servers and/or cable or network equipment devices. Various embodiments are also directed to methods, e.g., method of controlling and/or operating a communications system including EP devices, e.g. IoT EP devices, gateways, a network server, and a control server, e.g. an application server. Various embodiments are also directed to methods, e.g., method of operating a control server to associate and EP device with a particular gateway, establish an E2E communications path between an EP device and the control server, control TX power levels at EP devices and gateways, and manage loading and interference. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g. a control server such as application server (AS), a network server, a gateway such as an IoT gateway, terrestrial gateways, e.g. terrestrial IoT GWs, satellite gateways, e.g., IoT satellite GWs, an End Point (EP) device such as EP IoT device, e.g. EP IoT sensor or application device, a user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, satellites, satellite components, satellite units, satellite ground stations, etc., said device including a processor configured to implement one, multiple or all of the steps of one or more methods of the invention.

In some embodiments, the processor or processors, e.g., CPUs, of one or more devices, e.g., a control server such as application server (AS), network server, gateway such as IoT gateway, terrestrial gateways, e.g. terrestrial IoT GWs, satellite gateways, e.g., IoT satellite GWs, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, satellites, satellite components, satellite units, satellite ground stations, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server such as application server (AS), network server, gateway such as an IoT gateway, terrestrial gateways, e.g. terrestrial IoT GWs, satellite gateways, e.g., IoT satellite GWs, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, satellites, satellite components, satellite units, satellite ground stations, etc., includes a component corresponding to each of one or more of the steps of the various described methods performed by the device in which the processor is included. In some but not all embodiments a device, e.g., a control server such as application server (AS), network server, gateway such as IoT gateway, terrestrial gateways, e.g. terrestrial IoT GWs, satellite gateways, IoT satellite GWs, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, satellites, satellite components, satellite units, satellite ground stations, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as control server such as an application server (AS), network server, gateway such as IoT gateway, terrestrial gateways, e.g. terrestrial IoT GWs, satellite gateways, e.g., IoT satellite GWs, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, 5-GW/P-GW, satellites, satellite components, satellite units, satellite ground stations, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method implemented by an end point (EP) device, the method comprising:
operating the EP device to attempt to communicate, while operating in a terrestrial mode of operation, with a network server via one or more terrestrial gateways, said attempt to communicate including transmitting a packet;
monitoring a first set of terrestrial downlink receive windows used by terrestrial gateways for an acknowledgment corresponding to said packet from a terrestrial gateway following the transmission of said packet;
determining, from a failure to receive an acknowledgement of the said packet transmitted during said terrestrial mode of operation that communications via only terrestrial gateways at a desired data rate is not possible; and
in response to determining that communications via only terrestrial gateways at a desired data rate is not possible switching into a satellite compatible mode of operation; and
operating the EP device in satellite compatible mode of operation, wherein operating in said satellite compatible mode of operation includes:
transmitting an additional packet; and
monitoring for an acknowledgment corresponding to said additional packet in both i) the first set of terrestrial downlink receive windows and ii) an additional downlink receive window, said additional downlink receive window being a satellite downlink receive window.

2. The communications method of claim 1, wherein said packet transmitted while operating in a terrestrial mode of operation is a packet transmitted at a maximum supported EP device transmit power level; and
wherein the method further comprises:
transmitting, prior to transmitting said packet at the maximum supported EP device transmit power level, while operating in the terrestrial mode of operation, at least two other packets at different power levels lower than said maximum supported EP device transmit power level.

3. The communications method of claim 2, further comprising:
prior to determining, from a failure to receive an acknowledgement that communications via only terrestrial gateways at a desired data rate is not possible, performing at least one of i) increasing transmit power to a maximum EP transmit power level or ii) increasing a spreading factor (SF) to a maximum spreading factor.

4. The communications method of claim 3, wherein said operating an EP device to attempt to communicate with a network server via one or more terrestrial gateways includes transmitting said packet from the EP device using the maximum EP transmit power level.

5. The communications method of claim 2, wherein during said satellite compatible mode of operation the EP device monitors more downlink receive windows for acknowledgements following a packet transmission than during a terrestrial mode of operation which is used prior to switching into the satellite compatible mode of operation.

6. The communications method of claim 3, wherein said packet is transmitted with a request for an acknowledgement.

7. The communications method of claim 6, further comprising:
storing information in said end point device indicating that said end point device is a high QoS end point device, said high QoS end point device being an end point device entitled to use satellite communication when terrestrial communication is unable to provide a desired QoS level to which the end point device is entitled.

8. An end point (EP) device, comprising:
a processor configured to:
operate the EP device to attempt to communicate, while operating in a terrestrial mode of operation, with a network server via one or more terrestrial gateways, said attempt to communicate including transmitting a packet;
operate the EP device to monitor a first set of terrestrial downlink receive windows used by terrestrial gateways for an acknowledgment corresponding to said packet from a terrestrial gateway following the transmission of said packet;
determine, from a failure to receive an acknowledgement of the packet transmitted during said terrestrial mode of operation that communications via only terrestrial gateways at a desired data rate is not possible; and
in response to determining that communications via only terrestrial gateways at a desired data rate is not possible, operating the EP device to switch into a satellite compatible mode of operation; and
operate the EP device in satellite compatible mode of operation, wherein operating in said satellite compatible mode of operation includes:
transmitting from the EP device an additional packet; and
monitoring for an acknowledgment corresponding to said additional packet in both i) the first set of terrestrial downlink receive windows and ii) an additional downlink receive window, said additional downlink receive window being a satellite downlink receive window.

9. The EP device of claim 8, wherein said processor is further configured to control the EP device to:
receive, while operating in the satellite compatible mode of operation, an acknowledgment to the additional packet in one of the first set of terrestrial downlink receive windows; and
transition the EP device, in response to receiving said acknowledgment to the additional packet in one of the first set of terrestrial downlink receive windows, from the satellite compatible mode of operation to a terrestrial only mode of operation.

10. The EP device of claim 9, wherein said processor is further configured to:
prior to determining, from a failure to receive an acknowledgement that communications via only terrestrial gateways at a desired data rate is not possible, operate the end point device to perform at least one of i) increasing transmit power to a maximum EP transmit power level or ii) increasing a spreading factor (SF) to a maximum spreading factor.

11. The EP device of claim 10, wherein said processor is configured to:

operate the EP device to transmit said packet from the EP device using the maximum EP transmit power level, as part of being configured to operate an EP device to attempt to communicate with a network server via one or more terrestrial gateways.

12. The EP device of claim 10, wherein said processor is further configured to:
operate the EP device to store information in said end point device indicating that said end point device is a high QoS end point device, said high QoS end point device being an end point device entitled to use satellite communication when terrestrial communication is unable to provide a desired QoS level to which the end point device is entitled.

13. The method of claim 2, further comprising:
recognizing, while operating in the terrestrial mode of operation, a failure to receive acknowledgments to the at least two other packets transmitted at different power levels lower than said highest power level prior to transmitting said packet at the highest supported EP device transmit power level.

14. The method of claim 2, wherein transmitting the additional packet while operating the EP device in satellite compatible mode of operation includes transmitting the additional packet at the maximum EP transmit power.

15. The method of claim 1, further comprising:
receiving an acknowledgment to the additional packet in one of the first set of terrestrial downlink receive windows while operating in said satellite compatible mode of operation; and
transitioning the EP device, in response to receiving said acknowledgment to the additional packet in one of the first set of terrestrial downlink receive windows, from said satellite compatible mode of operation into a terrestrial only mode of operation.

16. The method of claim 2, further comprising:
receiving an acknowledgment to the additional packet in the satellite downlink receive window.

17. The method of claim 16, further comprising:
determining, based on the receipt of an acknowledgment in the satellite downlink receive window that communications via a satellite gateway has been established.

18. The method of claim 17, further comprising:
following determining that communications via a satellite gateway has been established, i) transmitting another packet at the maximum transmit power level; and
monitoring for an acknowledgment corresponding to said another packet in both ii) a terrestrial downlink receive window and ii) a satellite downlink receive window.

19. The EP device of claim 8, wherein said processor is further configured to control the EP device to:
receive an acknowledgment to the additional packet in the satellite downlink receive window; and
determine, based on the receipt of an acknowledgment in the satellite downlink receive window that communications via a satellite gateway has been established.

20. The EP device of claim 19, wherein said processor is further configured to control the EP device to:
transmit, following determining that communications via a satellite gateway has been established, another packet at the maximum transmit power level; and
monitor for an acknowledgment corresponding to said another packet in both i) a terrestrial downlink receive window and ii) a satellite downlink receive window.

* * * * *